US012681399B2

(12) United States Patent
Saeki et al.

(10) Patent No.: US 12,681,399 B2
(45) Date of Patent: Jul. 14, 2026

(54) TONER

(71) Applicant: CANON KABUSHIKI KAISHA, Tokyo (JP)

(72) Inventors: Tatsuya Saeki, Shizuoka (JP); Kenji Aoki, Shizuoka (JP); Naoya Isono, Shizuoka (JP); Mariko Yamashita, Shizuoka (JP); Yuki Masuda, Shizuoka (JP); Megumi Moriya, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 465 days.

(21) Appl. No.: 18/502,515

(22) Filed: Nov. 6, 2023

(65) Prior Publication Data

US 2024/0192617 A1 Jun. 13, 2024

(30) Foreign Application Priority Data

Nov. 17, 2022 (JP) ................................ 2022-184231

(51) Int. Cl.
*G03G 9/087* (2006.01)
*G03G 9/08* (2006.01)

(52) U.S. Cl.
CPC ....... *G03G 9/08711* (2013.01); *G03G 9/0819* (2013.01)

(58) Field of Classification Search
CPC ........... G03G 9/08708; G03G 9/08711; G03G 9/08731
See application file for complete search history.

(56) References Cited

U.S. PATENT DOCUMENTS 8,367,289 B2 2/2013 Isono
8,440,382 B2 5/2013 Isono
8,497,054 B2 7/2013 Sugiyama
8,652,725 B2 2/2014 Watanabe
8,652,737 B2 2/2014 Handa
8,741,519 B2 6/2014 Watanabe
8,778,581 B2 7/2014 Nonaka
8,785,101 B2 7/2014 Kaya
8,846,284 B2 9/2014 Kinumatsu
9,158,216 B2 10/2015 Shimano
9,309,349 B2 4/2016 Watanabe
9,377,705 B2 6/2016 Shimano
9,383,668 B2 7/2016 Noji
9,429,860 B2 8/2016 Kinumatsu
9,500,972 B2 11/2016 Tanaka
9,575,424 B2 2/2017 Nakagawa
9,599,919 B2 3/2017 Isono
9,625,844 B2 4/2017 Kaya
9,658,549 B2 5/2017 Tanaka
9,658,554 B2 5/2017 Kinumatsu
9,785,071 B2 10/2017 Shimano
9,798,256 B2 10/2017 Kosaki
9,798,262 B2 10/2017 Toyoizumi
9,811,016 B2 11/2017 Aoki
9,823,595 B2 11/2017 Toyoizumi
9,829,816 B2 11/2017 Tanaka
9,835,964 B2 12/2017 Yoshida
9,857,713 B2 1/2018 Kosaki
9,869,943 B2 1/2018 Aoki
9,904,193 B2 2/2018 Nakagawa
9,958,801 B2 5/2018 Tanaka
10,078,279 B2 9/2018 Nakagawa
10,101,681 B2 10/2018 Tagawa
10,216,107 B2 2/2019 Tsubaki
10,241,430 B2 3/2019 Kimura
10,289,016 B2 5/2019 Fukudome
10,295,921 B2 5/2019 Ohmori
10,409,180 B2 9/2019 Koji
10,578,990 B2 3/2020 Tsuda
10,732,530 B2 8/2020 Matsui
10,747,134 B2 8/2020 Watanabe
10,768,540 B2 9/2020 Watanabe
10,782,623 B2 9/2020 Yoshiba
10,877,388 B2 12/2020 Aoki
10,877,389 B2 12/2020 Kamikura
10,948,839 B2 3/2021 Tsubaki
(Continued)

FOREIGN PATENT DOCUMENTS

JP 2002-108018 A 4/2002
JP 2014-142632 A 8/2014
(Continued)

*Primary Examiner* — Peter L Vajda
(74) *Attorney, Agent, or Firm* — VENABLE LLP

(57) ABSTRACT

A toner comprises a toner particle, wherein the toner contains a crystalline vinyl resin and an amorphous resin, a weight-average particle diameter of the toner is from 4.0 to 12.0 m, an endothermic quantity ΔH derived from the crystalline vinyl resin is from 10 to 70 J/g, and in an analysis by time-of-flight secondary ion mass spectrometry of the toner particle while under sputtering, with A(100) as the ion amount of a specific hydrocarbon over a sputtering time during which 100 nm of a polymethyl methacrylate standard sample film are shaved, the ion amount exhibits one or more peak values, and with $A(d_{max})$ as a maximum value from among the peak values, the above $A(d_{max})$ and A(100) satisfy the expression below.

$$1.5 \le A(d_{max})/A(100) \le 30.0$$

7 Claims, No Drawings

(56) References Cited

U.S. PATENT DOCUMENTS

| | | | | |
|---|---|---|---|---|
| 10,969,704 | B2 | 4/2021 | Kagawa | |
| 11,086,242 | B2 | 8/2021 | Isono | |
| 11,112,708 | B2 | 9/2021 | Uratani | |
| 11,112,709 | B2 | 9/2021 | Saeki | |
| 11,112,713 | B2 | 9/2021 | Akiyama | |
| 11,181,839 | B2 | 11/2021 | Yamashita | |
| 11,181,840 | B2 | 11/2021 | Nagata | |
| 11,181,846 | B2 | 11/2021 | Kinumatsu | |
| 11,287,758 | B2 | 3/2022 | Matsui | |
| 11,333,989 | B2 | 5/2022 | Unno | |
| 11,448,980 | B2 | 9/2022 | Matsui | |
| 11,822,286 | B2 | 11/2023 | Kenmoku | |
| 2014/0205944 | A1 | 7/2014 | Masuda | |
| 2014/0308611 | A1 | 10/2014 | Shimano | |
| 2021/0055667 | A1* | 2/2021 | Watanabe | G03G 9/08793 |
| 2021/0318631 | A1 | 10/2021 | Isono | |
| 2021/0373450 | A1 | 12/2021 | Kawaguchi | |
| 2022/0075284 | A1 | 3/2022 | Nakayama | |
| 2022/0128916 | A1 | 4/2022 | Yoshida | |
| 2022/0146953 | A1 | 5/2022 | Kyuushima | |
| 2022/0146954 | A1 | 5/2022 | Kato | |
| 2022/0291601 | A1 | 9/2022 | Katsura | |
| 2022/0326633 | A1 | 10/2022 | Aoki | |
| 2022/0334507 | A1 | 10/2022 | Aoki | |
| 2022/0342329 | A1 | 10/2022 | Yamamoto | |
| 2022/0390870 | A1 | 12/2022 | Kyuushima | |
| 2022/0390871 | A1 | 12/2022 | Isono | |
| 2022/0397836 | A1 | 12/2022 | Toyoda | |
| 2022/0404730 | A1 | 12/2022 | Nagaoka | |
| 2023/0004099 | A1 | 1/2023 | Seino | |
| 2023/0042289 | A1 | 2/2023 | Tanaka | |
| 2023/0116451 | A1 | 4/2023 | Uratani | |
| 2023/0119795 | A1 | 4/2023 | Saeki | |
| 2023/0400789 | A1 | 12/2023 | Komuro | |
| 2024/0019792 | A1 | 1/2024 | Isono | |
| 2024/0027929 | A1 | 1/2024 | Ookubo | |

FOREIGN PATENT DOCUMENTS

| | | | |
|---|---|---|---|
| JP | 2022-163694 | A | 10/2022 |
| WO | 2013/047296 | A | 4/2013 |

* cited by examiner

TONER

BACKGROUND OF THE INVENTION

Field of the Invention

The present disclosure relates to a toner used in electrophotography and electrostatic recording.

Description of the Related Art

Recent years have witnessed a strong demand for electrophotographic image forming apparatuses that afford significantly higher process speeds with lower energy consumption. In electrophotographic image forming apparatuses of yet higher speed there is shortened the time required for each step in an electrophotographic process, such as charging, development, transfer and fixing. In order to preserve the quality of electrophotographic images, in particular, it is important to develop techniques for instantaneous uniform charging of toner and techniques for instantaneous melting and fixing of toner. From the viewpoint of reducing energy requirements, it is moreover necessary to lower a fixing unit temperature in the electrophotographic image forming apparatus; thus, techniques for fixing toner at lower temperatures are important in this regard. Such being the case it has become more necessary than ever to develop so-called "low-temperature fixability" techniques that allow for instantaneous fixing of toner at low temperature.

Methods aimed at improving the low-temperature fixability of toner include methods that involve adding a plasticizer to an amorphous binder resin, as in WO 2013/047296.

In order to further improve the low-temperature fixability of the toner, other methods involve using a crystalline resin as a binder resin. On account of the regular arrangement of molecular chains of crystalline resins, these resins characteristically do not virtually soften at a temperature lower than the melting point of the resin. Once the melting point is exceeded, moreover, crystals melt quickly, giving rise to a sharp drop in viscosity. Accordingly, crystalline resins are attracting attention as materials that boast excellent sharp-melt properties while affording improved low-temperature fixability.

Toners have been proposed that utilize crystalline vinyl resins having long-chain alkyl groups in a side chain of the molecule. Crystalline vinyl resins are ordinarily excellent in terms of sharp melt property, through crystallization of long-chain alkyl groups to one another in side chains of the resin.

Japanese Patent Application Publication No. 2002-108018 proposes a toner that utilizes two types of crystalline vinyl resins, in an emulsification aggregation method.

Japanese Patent Application Publication No. 2022-163694 proposes a toner in which a crystalline vinyl resin is disposed inside a toner particle, while an amorphous vinyl resin is disposed at a surface layer of the toner particle.

Japanese Patent Application Publication No. 2014-142632 proposes a toner including: a core having formed therein a sea-island structure made up of a crystalline vinyl resin, resulting from copolymerization of a polymerizable monomer having a long-chain alkyl group and an amorphous polymerizable monomers having a different SP value, and an amorphous resin; and a shell of an amorphous vinyl resin.

SUMMARY OF THE INVENTION

In WO 2013/047296, the softening rate of the binder resin is increased while the glass transition temperature (Tg) of the toner is maintained as-is. However, it was found that low-temperature fixability was herein insufficient, in electrophotographic image forming apparatuses of higher speed, since the toner softens when undergoing a step of plasticizing the binder resin after melting of the plasticizer, so that there is accordingly a limit to the melting rate of the toner.

The toner of Japanese Patent Application Publication No. 2002-108018 proved to satisfy low-temperature fixability and heat-resistant storability in an electrophotographic device of yet higher speed. It was however found that so-called white spots occurred, in that a toner of low charge quantity partly failed to be printed on a solid image. The inventors surmise that underlying reasons for the above occurrence include the difficulty in holding charge from the surface down to the interior of the toner, and the difficulty in achieving instantaneous uniform charging, derived from the nature of the crystalline vinyl resins.

It was moreover found that bringing out high gloss values in a solid image was likewise difficult. The inventors speculate that the underlying reason for this is that release from a fixing roller cannot be rendered uniform in a fixing system on account of a shorter passage time and on account of insufficient elasticity at the time of melting, derived from the presence of a large amount of crystalline resin in the toner.

In Japanese Patent Application Publication No. 2022-163694, a large amount of amorphous resin being present at the toner surface layer allows for uniform charging, such that a solid image with few white spots is obtained in electrophotographic image forming apparatuses of yet higher speed. Similarly to Japanese Patent Application Publication No. 2002-108018, however, gloss is insufficient on account of the large amount of crystalline resin present within the toner.

Although the toner disclosed in Japanese Patent Application Publication No. 2014-142632 exhibits higher elasticity, when melted, than the toner disclosed in Japanese Patent Application Publication No. 2022-163694, the former proved to exhibit insufficient gloss in an electrophotographic image forming apparatus of yet higher speed. The inventors infer that the above derives from the presence of a large amount of amorphous resin on the toner surface layer, which in turn makes uniform melting down to the interior of the toner difficult, in fixing systems with shorter passage times.

The present disclosure is aimed at a toner that exhibits good low-temperature fixability, and that affords solid images of high gloss with few white spots, in an electrophotographic image forming apparatus of higher speed.

One aspect of the present disclosure relates to a toner comprising a toner particle, wherein

- the toner comprises a crystalline vinyl resin and an amorphous resin,
  - the toner has a weight-average particle diameter of 4.0 to 12.0 μm; and
- an endothermic quantity ΔH derived from the crystalline vinyl resin in a differential scanning calorimetric measurement of the toner is 10 to 70 J/g;
- in an analysis by time-of-flight secondary ion mass spectrometry of the toner particle, while under sputtering over a sputtering time during which 100 nm of a polymethyl methacrylate standard sample film are shaved,
- with A(100) as an amount of ions represented by Formula (A) below at the sputtering time of which 100 nm of the standard sample film are shaved;
- the amount of ions represented by Formula (A) exhibits one or more peak values, from the start of a measurement over a sputtering time during which 100 nm of the standard sample film are shaved;

and with $A(d_{max})$ as a maximum value from among the peak values, the $A(d_{max})$ and A(100) satisfy Expression (1) below.

$$1.5 \leq A(d_{max})/A(100) \leq 30.0 \quad (1)$$

$$-(CH_2)_n- \quad (A)$$

where in Formula (A), n is from 18 to 30.

One aspect of the present disclosure can provide a toner that exhibits good low-temperature fixability, and that affords solid images of high gloss with few white spots, in an electrophotographic image forming apparatus of higher speed.

Further features of the present invention will become apparent from the following description of exemplary embodiments.

DESCRIPTION OF THE EMBODIMENTS

In the present disclosure the notations "from XX to YY" and "XX to YY" representing a numerical value range signify, unless otherwise specified, a numerical value range that includes the lower limit and the upper limit of the range, as endpoints. In a case where numerical value ranges are described in stages, the upper limits and the lower limits of the respective numerical value ranges can be combined arbitrarily.

The term (meth)acrylic acid ester refers to an acrylic acid ester and/or methacrylic acid ester.

The term "monomer unit" denotes a form, in a polymer, resulting from reaction of a monomer substance. For instance, one unit is herein one carbon-carbon bond section in a main chain of a polymer and that results from polymerization of a polymerizable monomer. The polymerizable monomer can be represented by the following formula.

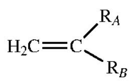

(C)

[In the formula, $R_A$ represents a hydrogen atom or an alkyl group (preferably a C1 to C3 alkyl group, more preferably a methyl group), and $R_B$ represents an arbitrary substituent.]

A crystalline resin is a resin that exhibits a distinct endothermic peak in a differential scanning calorimetry (DSC) measurement.

The toner of the present disclosure will be explained in detail below.

The present disclosure relates to a toner comprising a toner particle, wherein the toner comprises a crystalline vinyl resin and an amorphous resin, the toner has a weight-average particle diameter of 4.0 to 12.0 μm; and an endothermic quantity ΔH derived from the crystalline vinyl resin in a differential scanning calorimetric measurement of the toner is 10 to 70 J/g;

in an analysis by time-of-flight secondary ion mass spectrometry of the toner particle, while under sputtering over a sputtering time during which 100 nm of a polymethyl methacrylate standard sample film are shaved, with A(100) as an amount of ions represented by Formula (A) below at the sputtering time of which 100 nm of the standard sample film are shaved;

the amount of ions represented by Formula (A) exhibits one or more peak values, from the start of a measurement over a sputtering time during which 100 nm of the standard sample film are shaved;

and with $A(d_{max})$ as a maximum value from among the peak values, the $A(d_{max})$ and A(100) satisfy Expression (1) below.

$$1.5 \leq A(d_{max})/A(100) \leq 30.0 \quad (1)$$

$$-(CH_2)_n- \quad (A)$$

where in Formula (A), n is from 18 to 30.

With a view to solving the above problems, the inventors studied methods for controlling the manner in which a crystalline vinyl resin and an amorphous resin are present in the toner. As described above, the use of crystalline vinyl resins has been addressed conventionally from the viewpoint of low-temperature fixability, as in Japanese Patent Application Publication No. 2002-108018. With a view to achieving both charging performance and low-temperature fixability, an approach has been studied that involves adding a crystalline resin into the interior of the toner, while arranging an amorphous resin on a surface layer of the toner, as disclosed in Japanese Patent Application Publication No. 2022-163694 and Japanese Patent Application Publication No. 2014-142632. However, these methods entail a trade-off between the occurrence of white spots in a solid image and a decrease in gloss, in electrophotographic apparatuses of yet higher speeds. The inventors have therefore come up with a configuration that allows resolving this trade-off, through arrangement of a crystalline vinyl resin on the surface and near the surface of the toner particle.

As a result of diligent research, the inventors have found that the above problems can be solved by controlling the amount, and the manner of presence, of a crystalline vinyl resin and of an amorphous resin in the toner. Specifically, the amount of the crystalline vinyl resin in the toner is set to lie within a certain range, and a ratio of a long-chain alkyl amount in the interior of the toner relative to that on the toner surface and the vicinity of the surface is set to lie within a certain range. As a result, regions of significant presence of the crystalline vinyl resin become provided on the toner surface and in the vicinity of the surface, and the interior of the toner can be charged rapidly, which in consequence is deemed to result in good uniform charging performance.

The toner melts moreover instantaneously, down to the interior thereof, at the time of fixing, and the amorphous resin inside the toner can retain a certain degree of elasticity even after melting. It is deemed that, as a result, the toner is squashed uniformly by a fixing roller, which translates into high gloss, also when process speed is very high. In view of the above considerations, the inventors deem that low-temperature fixability should accordingly improve and the trade-off between the occurrence of white spots and a drop in gloss can be resolved.

The toner of the present disclosure has a toner particle containing a crystalline vinyl resin and an amorphous resin. The weight-average particle diameter of the toner is from 4.0 to 12.0 μm. When the weight-average particle diameter of the toner lies within this range, the above Expression (1) is readily controlled within the range in the expression. From the same standpoint, the weight-average particle diameter of the toner is preferably from 5.0 to 10.0 μm, more preferably from 6.0 to 8.5 μm.

An endothermic quantity ΔH derived from a crystalline vinyl resin in a differential scanning calorimetric measurement (DSC measurement) of the toner is from 10 to 70 J/g.

The endothermic quantity ΔH denotes the crystal content of the crystalline vinyl resin in the toner. Therefore, the toner can melt instantaneously at the time of fixing, in an electrophotographic image forming apparatus of yet higher speed, and low-temperature fixability can be improved, when the endothermic quantity ΔH derived from a crystalline vinyl resin is 10 J/g or higher. From the same standpoint, the endothermic quantity ΔH is preferably 15 J/g or higher, and more preferably 20 J/g or higher.

The uniform charging performance of the toner is improved, and white spots in solid image can be improved upon, in an electrophotographic image forming apparatus of yet higher speed, when the endothermic quantity ΔH derived from a crystalline vinyl resin is 70 J/g or lower. From the same standpoint, the endothermic quantity ΔH is preferably 60 J/g or lower, more preferably 50 J/g or lower. For instance, the endothermic quantity ΔH is preferably from 15 to 60 J/g, and more preferably from 20 to 50 J/g.

An endothermic peak derived from the crystalline vinyl resin is preferably present in the range of 50.0 to 90.0° C., more preferably in the range from 50.0 to 80.0° C., since in that case heat-resistant storability and low-temperature fixability are readily improved. The endothermic quantity ΔH derived from a crystalline vinyl resin can be controlled on the basis of the amount of the crystalline vinyl resin in the toner and on the basis of the long-chain alkyl amount in the crystalline vinyl resin.

The toner particle is analyzed by time-of-flight secondary ion mass spectrometry while under sputtering over a sputtering time such that there are shaved 100 nm of a polymethyl methacrylate standard sample film (PMMA standard sample film). Herein A(100) denotes the amount of ions represented by Formula (A) below at the sputtering time of which 100 nm of the PMMA standard sample film are shaved. The amount of ions represented by Formula (A) below exhibits one or more peak values from the start of the measurement over the sputtering time during which 100 nm of the PMMA standard sample film are shaved. Further $A(d_{max})$ and A(100) satisfy Expression (1) below, where $A(d_{max})$ denotes the maximum value among the above peak values.

$$1.5 \le A(d_{max})/A(100) \le 30.0 \tag{1}$$

$$-(CH_2)_n- \tag{A}$$

(In Formula (A), n=18 to 30)

Herein, the feature to the effect that the amount of ions represented by Formula (A) has one or more peak values from the start of the measurement and over the sputtering time during which 100 nm of the PMMA standard sample film are shaved signifies that the amount of Formula (A) varies in a region from the surface of the toner particle down to about 100 nm inside the toner particle. Specifically, the above feature indicates that there is a portion at which the amount of Formula (A) is larger than that at a position about 100 nm inward from the surface of the toner particle, in a region from the surface of the toner particle down to about 100 nm inside the toner particle.

Further, $A(d_{max})$ represents the maximum amount of Formula (A) in the region from the surface of the toner particle down to about 100 nm inside the toner particle. Further, A(100) denotes the amount of Formula (A) at a position about 100 nm inward from the surface of the toner particle.

Therefore, a value of $A(d_{max})/A(100)$ being close to 1 signifies that a resin having a small amount of Formula (A), such as an amorphous resin, is present in a large amount in a region from the surface of the toner particle down to about 100 nm inside the toner particle. Also, a value of $A(d_{max})/A(100)$ being close to 1 signifies that the amount of Formula (A) virtually does not change from the surface of the toner particle down to about 100 nm in the interior.

Further a value $A(d_{max})/A(100)$ being higher than 1 signifies that the portion at which the amount of Formula (A) is greater than that at the position about 100 nm inward from the surface of the toner particle is present on the side of the surface of the toner particle.

When the value of $A(d_{max})/A(100)$ is 1.5 or higher, the crystalline vinyl resin that is unevenly distributed biased towards the toner surface and the vicinity thereof becomes instantaneously charged, through rubbing against a charging member, and the generated charge can be held inside the toner. As a result, uniform charging performance improves, and a good solid image having few white spots can be obtained.

In addition, the crystalline vinyl resin on the surface of the toner and the vicinity thereof melts instantaneously at the time of fixing, such that heat can be imparted instantaneous to the interior of the toner. As a result, the toner becomes uniformly squashed by the fixing roller, and a high-gloss solid image can be achieved, also when the process speed is very high.

From the same standpoint, the value of $A(d_{max})/A(100)$ is preferably 2.0 or higher, more preferably 2.5 or higher.

When the value of $A(d_{max})/A(100)$ is 30.0 or lower, the amount of crystalline vinyl resin at and near the surface of the toner is an appropriate amount that allows preventing charge from leaking to other members, thanks to which charge retention in the toner is improved. As a result, the toner can be instantaneously charged uniformly, and a good solid image with few white spots can be obtained. From the same standpoint, the value of $A(d_{max})/A(100)$ is preferably 20.0 or lower, and more preferably 12.0 or lower.

The value of $A(d_{max})/A(100)$ is preferably from 2.0 to 20.0, more preferably from 2.5 to 12.0.

The value of $A(d_{max})$ in Expression (1) can be controlled on the basis of the long-chain alkyl amount at and near the toner surface. The value of A(100) can be controlled, once the portion of large amount of crystalline vinyl resin at and near the surface has been made very thin, of less than 100 nm, on the basis of the proportion of the crystalline vinyl resin and the amorphous resin in the interior of the toner, and on the basis of the long-chain alkyl amount in the crystalline vinyl resin.

More specifically, for instance in a suspension polymerization method or an emulsification aggregation method, the value of $A(d_{max})/A(100)$ can be raised by increasing the amount of crystalline vinyl resin having hydrophilic monomer units introduced thereinto. Also, the value of $A(d_{max})/A(100)$ can be reduced by increasing the long-chain alkyl amount in the crystalline vinyl resin inside the toner, or by reducing the long-chain alkyl amount in the crystalline vinyl resin at or near the toner surface.

As described above, a feature wherein the amount of ions represented by Formula (A) has one or more peak values implies the presence of a portion at which the amount of Formula (A), in a region from the surface of the toner particle down to about 100 nm within the toner particle, is larger than that at a position about 100 nm inward from the surface of the toner particle. A standard value exhibiting a value that is at least 1.1 times the value of A(100) is deemed to be a peak in a TOF-SIMS analysis. This will be specifically described further on. In the absence of such peak it is difficult to uniformly squash the toner on the fixing roller, and it is likewise difficult to charge the toner uniformly when the process speed is very high. In consequence, it is difficult to obtain a solid image that combines high gloss with suppression of white spots.

In order to cause such a peak to develop, the portion of large amount of crystalline vinyl resin at or near the toner surface is made thinner than that about 100 nm from the surface. For instance in a suspension polymerization method or an emulsification aggregation method, specifically, there may be controlled the amount of a crystalline vinyl resin having highly hydrophilic monomer units introduced thereinto.

Herein a depth $d_{max}$ (nm) from the surface of the toner particle at which $A(d_{max})$ is observed is preferably from 15 to 90 nm, more preferably from 20 to 75 nm, and yet more preferably from 25 to 65 nm.

In Formula (A), n which indicates that the toner particle has a long-chain alkyl group, is from 18 to 30, in terms of adjusting the softening temperature of the toner and improving heat-resistant storability and low-temperature fixability. From the same standpoint, n is preferably from 20 to 26.

The toner particle preferably contains from 15.0 to 70.0 μmass % of the crystalline vinyl resin, relative to the mass of the toner particle. When the toner particle contains 15.0 μmass % or more of the crystalline vinyl resin, the melting rate of the toner increases, and low-temperature fixability readily improves. From the same standpoint, the content of the crystalline vinyl resin in the toner particle is more preferably 20.0 μmass % or higher, and yet more preferably 25.0 μmass % or higher.

When by contrast the toner particle contains 70.0 μmass % or less of the crystalline vinyl resin, elasticity at the time of toner melting rises, and a high-gloss solid image can be readily obtained. From the same standpoint, the content of the crystalline vinyl resin in the toner particle is more preferably 65.0 μmass % or lower, and yet more preferably 60.0 μmass % or lower.

The content of the crystalline vinyl resin in the toner particle is more preferably from 20.0 to 65.0 μmass %, and yet more preferably from 25.0 to 60.0 μmass %.

The crystalline vinyl resin preferably contains from 50.0 to 95.0 μmass % of a monomer unit (a) represented by Formula (a) below. When the amount of the monomer unit (a) is 50.0 μmass % or higher, the melting point of the crystalline vinyl resin becomes sharper, low-temperature fixability improves readily, and a high-gloss solid image can be easily achieved. From the same standpoint, the content of the monomer unit (a) is more preferably 55.0 μmass % or higher, and yet more preferably 60.0 μmass % or higher.

When the content of the monomer unit (a) in the crystalline vinyl resin is 95.0 mass % or lower, the uniform charging performance of the toner improves readily, and a better solid image with few white spots can be readily obtained. From the same standpoint, the content of the monomer unit (a) is more preferably 90.0 μmass % or lower, yet more preferably 85.0 μmass % or lower.

The content of the monomer unit (a) in the crystalline vinyl resin is preferably from 55.0 to 90.0 μmass %, more preferably from 60.0 to 85.0 μmass %.

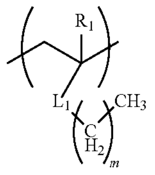

(a)

In Formula (a), $R_1$ represents a hydrogen atom or a methyl group, Li represents a single bond, an ester bond or an amide bond, and m represents an integer from 15 to 31.

Further, Li is preferably an ester bond —COO—, such that the carbonyl of the ester bond is bonded to the carbon to which $R_1$ is bonded.

The value of m in the monomer unit (a) indicates that the crystalline vinyl resin has a long-chain alkyl group, with the crystalline vinyl resin being likelier to readily exhibit crystallinity by having a long-chain alkyl group. From the viewpoint of adjusting the softening temperature of the toner and improving heat-resistant storability and low-temperature fixability, the value of m in the monomer unit (a) is preferably from 18 to 30, more preferably from 20 to 26. Herein m can correspond to n in Formula (A).

The method for introducing the monomer unit (a) may involve polymerizing a (meth)acrylic acid ester, such as those below, in the production of a crystalline vinyl resin. Examples include (meth)acrylic acid esters having a C16 to C32 alkyl group [for instance cetyl (meth)acrylate, stearyl (meth)acrylate, nonadecyl (meth)acrylate, eicosyl(meth) acrylate, heneicosyl (meth)acrylate, behenyl (meth)acrylate, lignoceryl (meth)acrylate, ceryl (meth)acrylate, octacosyl (meth)acrylate, myricyl (meth)acrylate, dotriacontyl (meth) acrylate and 2-decyltetradecyl (meth)acrylate].

The monomer unit (a) may be used singly or concomitantly in the form of two or more types.

The crystalline vinyl resin can also have other monomer units in addition to the monomer unit (a). The method for introducing other monomer units may involve polymerizing a (meth)acrylic acid ester and another vinylic monomer.

Other vinylic monomers include the following.

Styrene, α-methyl styrene, and (meth)acrylic acid esters such as methyl (meth)acrylate, ethyl (meth)acrylate, n-butyl (meth)acrylate, t-butyl (meth)acrylate and 2-ethylhexyl (meth)acrylate.

Monomers having a urea group: for instance monomers obtained through reaction, in accordance with known methods, of a C3 to C22 amine [a primary amine (for instance n-butylamine, t-butylamine, propylamine or isopropylamine), a secondary amine (for instance di-n-ethylamine, di-n-propylamine or di-n-butylamine), aniline, cycloxylamine or the like] with a C2 to C30 isocyanate having an ethylenically unsaturated bond.

Monomers having a carboxy group; for instance methacrylic acid, acrylic acid and 2-carboxyethyl (meth)acrylate.

Monomers having a hydroxy group; for instance 2-hydroxyethyl (meth)acrylate and 2-hydroxypropyl (meth)acrylate.

Monomers having an amide group; for instance acrylamide and monomers obtained through a reaction, in accordance with a known method, of a C1 to C30 amine and a C2 to C30 carboxylic acid having an ethylenically unsaturated bond (such as acrylic acid or methacrylic acid).

Monomers having a nitrile group: for instance acrylonitrile and methacrylonitrile.

Among the foregoing there is preferably used styrene, methyl (meth)acrylate, t-butyl (meth)acrylate or methacrylonitrile.

The crystalline vinyl resin preferably includes a crystalline vinyl resin A not containing a monomer unit (b) represented by Formula (b) below, and a crystalline vinyl resin B that contains the monomer unit (b) represented by Formula (b). The toner particle preferably contains from 1.5 to 15.0 μmass % of the crystalline vinyl resin B.

Within the above ranges the amount of the monomer unit (b) in the toner particle is appropriate, and it becomes easier to maintain charge at the carbonyl group moiety; as a result, the uniform charging performance improves and a better solid image is readily obtained that has few white spots. From the same standpoint, the toner particle more preferably contains from 2.5 to 12.0 μmass %, and yet more preferably from 3.0 to 8.0 μmass %, of the crystalline vinyl resin B.

(b)

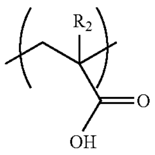

In Formula (b), $R_2$ represents a hydrogen atom or a methyl group.

The toner particle preferably contains from 10.0 to 65.0 μmass %, more preferably from 15.0 to 60.0 μmass %, and yet more preferably from 20.0 to 55.0 μmass %, of the crystalline vinyl resin A.

The crystalline vinyl resin A preferably contains the monomer unit (a), a styrenic monomer unit, and a monomer unit from (meth)acrylonitrile.

The crystalline vinyl resin A preferably contains from 40.0 to 90.0 μmass %, more preferably from 50.0 to 85.0 μmass %, of the monomer unit (a). The crystalline vinyl resin A preferably contains from 1.0 to 40.0 μmass %, more preferably from 2.0 to 30.0 μmass %, of a styrenic monomer unit. The crystalline vinyl resin A preferably contains from 1.0 to 25.0 μmass %, more preferably from 5.0 to 20.0 μmass %, of a monomer unit from (meth)acrylonitrile.

The crystalline vinyl resin B preferably contains the monomer unit (a), a styrenic monomer unit, and the monomer unit (b).

The crystalline vinyl resin B preferably contains from 50.0 to 95.0 μmass %, more preferably from 60.0 to 92.0 μmass %, of the monomer unit (a). The crystalline vinyl resin B preferably contains from 1.0 to 40.0 μmass %, more preferably from 5.0 to 30.0 μmass %, of a styrenic monomer unit. The crystalline vinyl resin B preferably contains from 1.0 to 15.0 μmass %, more preferably from 1.5 to 7.0 μmass %, of the monomer unit (b).

The acid value of the crystalline vinyl resin B is preferably from 5 to 35 mgKOH/g, and more preferably from 10 to 25 μmgKOH/g. Within the above ranges, the thickness of the crystalline vinyl resin at and near the surface of the toner is likely to be uniform, the charging performance of the toner improves readily, and a better solid image with few white spots can be readily obtained.

The weight-average molecular weight (Mw) of the crystalline vinyl resin A is preferably from 10000 to 50000, more preferably from 20000 to 40000.

The weight-average molecular weight (Mw) of the crystalline vinyl resin B is preferably from 5000 to 50000, more preferably from 15000 to 30000.

The toner particle contains a crystalline vinyl resin and an amorphous resin. The toner particle may contain for instance a crystalline vinyl resin and an amorphous resin, as binder resins. The toner particle preferably contains from 20.0 to 70.0 μmass % of an amorphous resin. Within this range, the endothermic quantity ΔH derived from a crystalline vinyl resin can be controlled readily to lie within the above range. From the same standpoint, the content ratio of the amorphous resin in the toner particle is more preferably from 25.0 to 65.0 μmass %, and yet more preferably from 30.0 to 60.0 μmass %.

Examples of amorphous resins include vinyl resins, polyester resins, polyurethane resins and epoxy resins. The amorphous resin preferably contains a vinyl resin, and more preferably the amorphous resin is a vinyl resin, since in that case the amorphous resin has a composition close to that of the crystalline vinyl resin, and readily blends well into the toner.

The toner particle preferably contains from 25.0 to 65.0 μmass %, more preferably from 30.0 to 60.0 μmass %, of a vinyl resin as the amorphous resin. When the toner particle contains 25.0 μmass % or more of the vinyl resin, the composition approaches that of the crystalline vinyl resin, uniform charging performance is likely to improve, and a better solid image with few white spots can be readily obtained. Low-temperature fixability tends to be better when the toner particle contains 65.0 μmass % or less of a vinyl resin.

In a case where the amorphous resin is a vinyl resin, i.e. an amorphous vinyl resin, this amorphous vinyl resin preferably has a monomer unit (c) represented by Formula (c) below.

When the amorphous vinyl resin has the monomer unit (c), compatibility with the crystalline vinyl resin is likely to improve, the interface between the crystalline vinyl resin and the amorphous resin in the toner blurs readily, and toner durability is easily improved.

(c)

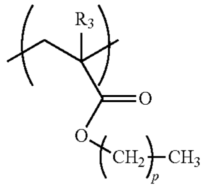

In Formula (c), $R_3$ represents a hydrogen atom or a methyl group, and p represents an integer from 3 to 35.

The range of p is preferably from 3 to 29, more preferably from 3 to 19, yet more preferably from 3 to 15, and still more preferably from 3 to 12.

The method for introducing the monomer unit (c) may involve further polymerizing, besides a (meth)acrylic acid ester that can be used in the monomer unit (a), also a (meth)acrylic acid ester such as those below. For instance butyl (meth)acrylate, hexyl (meth)acrylate, octyl (meth) acrylate, decyl (meth)acrylate, lauryl (meth)acrylate, myristyl (meth)acrylate and palmityl (meth)acrylate.

The monomer unit (c) may be used singly or concomitantly in the form of two or more types.

The amorphous vinyl resin can also have other monomer units, in addition to the monomer unit (c). The method for introducing other monomer units may involve polymerizing the above (meth)acrylic acid ester and a vinylic monomer that can be used in crystalline vinyl resins. The amorphous vinyl resin preferably further has a styrenic monomer unit.

The amorphous vinyl resin may have a crosslinked structure using a crosslinking agent. A known crosslinking agent such as hexanediol diacrylate can be used herein.

The amorphous vinyl resin preferably contains from 5.0 to 40.0 μmass %, more preferably from 10.0 to 35.0 μmass %, and yet more preferably from 15.0 to 30.0 μmass %, of the monomer unit (c).

The amorphous vinyl resin preferably contains from 50.0 to 90.0 μmass %, and more preferably from 65.0 to 85.0 μmass %, of a styrenic monomer unit.

The weight-average molecular weight (Mw) of a tetrahydrofuran (THF)-soluble fraction of the toner, as measured by gel permeation chromatography (GPC), is from 10000 to 200000. The lower limit is more preferably 30000 or higher, and yet more preferably 50000 or higher. The upper limit is more preferably 180000 or lower. The durability of the toner tends to further improve when Mw lies within the above ranges.

The toner particle may contain a release agent. The release agent is not particularly limited, but is preferably at least one selected from the group consisting of hydrocarbon waxes and ester waxes. Effective releasability can be readily ensured by using a hydrocarbon wax and/or an ester wax. The hydrocarbon wax is not particularly limited, and examples thereof include the following.

Aliphatic hydrocarbon waxes: low-molecular-weight polyethylene, low-molecular-weight polypropylene, a low-molecular-weight olefin copolymer, Fisher Tropsch wax, or wax obtained by oxidizing and acidifying these.

The ester wax may have at least one ester bond in one molecule, and either natural ester wax or synthetic ester wax may be used. The ester wax is not particularly limited, and examples thereof include the following.

Esters of monohydric alcohols and monocarboxylic acids, such as behenic behenate, stearyl stearate, palmitic palmitate, and the like;

- esters of divalent carboxylic acids and monohydric alcohols, such as dibehenyl sebacate and the like;
- esters of dihydric alcohols and monocarboxylic acids, such as ethylene glycol distearate, hexanediol dibehenate, and the like
- esters of trihydric alcohols and monocarboxylic acids, such as glycerin tribehenate and the like;
- esters of a tetrahydric alcohol and monocarboxylic acids, such as pentaerythritol tetrastearate, pentaerythritol tetrapalmitate, and the like;
- esters of hexahydric alcohols and monocarboxylic acids, such as dipentaerythritol hexastearate, dipentaerythritol hexapalmitate, dipentaerythritol hexabehenate, and the like;
- esters of polyfunctional alcohols and monocarboxylic acids, such as polyglycerin behenate and the like; and natural ester waxes such as carnauba wax and rice wax.

Among them, esters of hexahydric alcohols and monocarboxylic acids, such as dipentaerythritol hexastearate, dipentaerythritol hexapalmitate, dipentaerythritol hexabehenate, and the like are preferable.

As the release agent there may be used a hydrocarbon wax or an ester wax singly, or a hydrocarbon wax and an ester wax concomitantly, and likewise two or more types of each of the foregoing may be used mixed with one another. Preferably there is used herein a single type, or two or more types, of hydrocarbon wax. More preferably, the release agent is a hydrocarbon wax.

The content of the release agent in the toner particle of the toner is preferably from 1.0 μmass % to 30.0 μmass %, and more preferably from 2.0 μmass % to 25.0 μmass %. Releasability at the time of fixing can be ensured readily when the content of the release agent in the toner particle lies within the above range.

The melting point of the release agent is preferably from 60° C. to 120° C. When the melting point of the release agent lies within the above range, the release agent melts during fixing and exudes readily out onto the surface of the toner particle, and releasability can be easily brought out. More preferably, the melting point of the releasing agent is from 70° C. to 100° C.

The toner may include a colorant. Examples of the colorant include known organic pigments, organic dyes, inorganic pigments, carbon black as a black colorant, magnetic particles and the like. In addition, a colorant conventionally used for toner may be used. Examples of yellow colorants include condensed azo compounds, isoindolinone compounds, anthraquinone compounds, azo metal complexes, methine compounds, and allylamide compounds. Specifically, C. I. Pigment Yellow 12, 13, 14, 15, 17, 62, 74, 83, 93, 94, 95, 109, 110, 111, 128, 129, 147, 155, 168, and 180 are preferably used.

Examples of magenta colorants include condensed azo compounds, diketopyrrolopyrrole compounds, anthraquinone compounds, quinacridone compounds, basic dye lake compounds, naphthol compounds, benzimidazolone compounds, thioindigo compounds, and perylene compounds. Specifically, C. I. Pigment Red 2, 3, 5, 6, 7, 23, 48:2, 48:3, 48:4, 57:1, 81:1, 122, 144, 146, 166, 169, 177, 184, 185, 202, 206, 220, 221, and 254 are preferably used.

Examples of cyan colorants include copper phthalocyanine compounds and derivatives thereof, anthraquinone compounds, basic dye lake compounds.

Specifically, C. I. Pigment Blue 1, 7, 15, 15:1, 15:2, 15:3, 15:4, 60, 62, and 66 are preferably used.

These colorants may be selected in view of hue angle, chroma, lightness, lightfastness, OHP transparency and dispersibility in the toner particle. In a case where the colorant is not a magnetic particle, the content of the colorant is preferably 1.0 to 20.0 parts by mass relative to 100.0 parts by mass of the binder resin. In cases where a magnetic particle is used as a colorant, the content thereof is preferably from 40.0 parts by mass to 150.0 parts by mass relative to 100.0 parts by mass of the binder resin.

A charge control agent may be incorporated into the toner particle, as needed. The charge control agent may also be externally added to the toner particle. By blending a charge control agent into the toner particle it becomes possible to stabilize charge characteristics and to control an optimal triboelectric charge quantity according to the development system.

A known agent can be used as the charge control agent; in particular, a charge control agent is preferably used that affords high charging speed and that is capable of stably maintaining a constant charge quantity.

Examples of charge control agents that control toner so as to be negatively chargeable include the following. Organometallic compounds and chelate compounds are effective herein; examples include monoazo metal compounds, acetylacetone metal compounds, aromatic oxycarboxylic acids, aromatic dicarboxylic acids, oxycarboxylic acids and dicarboxylic acid-based metal compounds.

Examples of charge control agents that control toner so as to be positively chargeable include the following. Nigrosine, quaternary ammonium salts, metal salts of higher fatty acids, diorganotin borates, guanidine compounds and imidazole compounds.

The content of the charge control agent is preferably from 0.01 parts by mass to 20.0 parts by mass, more preferably from 0.5 parts by mass to 10.0 parts by mass, relative to 100.0 parts by mass of the toner particle.

The toner particle may be used as-is, as the toner; alternatively, the toner may be obtained by mixing an external additive or the like with the toner particle, as needed, and thereby cause the external additive to adhere to the toner particle surface.

Examples of the external additive include inorganic fine particles selected from the group consisting of silica fine particles, alumina fine particles, and titania fine particles, as well as complex oxides of the foregoing. Examples of complex oxides include silica aluminum fine particles and strontium titanate fine particles.

The content of the external additive is preferably from 0.01 parts by mass to 8.0 parts by mass, and more preferably from 0.1 parts by mass to 4.0 parts by mass relative to 100 parts by mass of the toner particle.

The method for producing the toner particle is not particularly limited, so long as the toner particle lies within the scope of the present configuration. The toner may be produced in accordance with any known method such as suspension polymerization, emulsification aggregation, dissolution suspension, or pulverization. Suspension polymerization and emulsification aggregation are preferable herein, and more preferably suspension polymerization in terms of readily controlling the amount of Formula (A) at and near the toner particle surface. That is, the toner particle is preferably a suspension polymerization toner particle or an emulsification aggregation toner particle, and more preferably is a suspension polymerization toner particle.

A suspension polymerization method will be described in detail next.

For instance a crystalline vinyl resin (e.g., crystalline vinyl resin A and crystalline vinyl resin B) synthesized beforehand is added to a mixture of polymerizable monomers that yield an amorphous resin (preferably an amorphous vinyl resin). Other materials such as a colorant, a release agent and a charge control agent are added and uniformly dissolved or dispersed, as needed, to prepare a polymerizable monomer composition.

Thereafter, the polymerizable monomer composition is dispersed in an aqueous medium using for instance a stirrer, to prepare suspended particles of the polymerizable monomer composition. A toner particle is thereafter obtained through polymerization of the polymerizable monomers contained in the particles, using for instance an initiator.

Once polymerization is over, the toner particle is filtered, washed and dried in accordance with a known method; a toner may be obtained thereupon through addition of an external additive, as needed.

The polymerization initiator can be a well-known polymerization initiator. Examples thereof include azo-based and diazo-based polymerization initiators such as 2,2'-azobis-(2,4-dimethylvaleronitrile), 2,2'-azobisisobutyronitrile, 1,1'-azobis(cyclohexane-1-carbonitrile), 2,2'-azobis-4-methoxy-2,4-dimethylvaleronitrile and azobisisobutyronitrile; and peroxide-based polymerization initiators such as benzoyl peroxide, t-butylperoxy 2-ethylhexanoate, t-butylperoxy pivalate, t-butylperoxy isobutyrate, t-butylperoxy neodecanoate, methyl ethyl ketone peroxide, diisopropylperoxy carbonate, cumene hydroperoxide, 2,4-dichlorobenzoyl peroxide and lauroyl peroxide.

In addition, well-known chain transfer agents and polymerization inhibitors may be used. The aqueous medium may contain an inorganic or organic dispersion stabilizer. The dispersion stabilizer can be a well-known dispersion stabilizer.

Examples of inorganic dispersion stabilizers include phosphates such as hydroxyapatite, tribasic calcium phosphate, dibasic calcium phosphate, magnesium phosphate, aluminum phosphate and zinc phosphate; carbonates such as calcium carbonate and magnesium carbonate; metal hydroxides such as calcium hydroxide, magnesium hydroxide and aluminum hydroxide; sulfates such as calcium sulfate and barium sulfate; calcium metasilicate; bentonite; silica; and alumina.

Meanwhile, examples of organic dispersion stabilizers include poly(vinyl alcohol), gelatin, methyl cellulose, methylhydroxypropyl cellulose, ethyl cellulose, sodium carboxymethyl cellulose, poly(acrylic acid) and salts thereof, and starch. In cases where an inorganic compound is used as a dispersion stabilizer, a commercially available product may be used as-is, but in order to obtain finer particles, it is possible to use a product obtained by dispersing an inorganic compound mentioned above in an aqueous medium. For example, in the case of a calcium phosphate such as hydroxyapatite or tribasic calcium phosphate, an aqueous solution of a phosphate and an aqueous solution of a calcium salt should be mixed under high speed stirring.

The aqueous medium may contain a surfactant. The surfactant can be a well-known surfactant. Examples of surfactants include anionic surfactants such as sodium dodecylbenzene sulfate and sodium oleate; cationic surfactants, amphoteric surfactants and non-ionic surfactants.

Calculation methods and measurement methods pertaining to various physical properties of toner and toner materials are described below.

Measurement of Weight-Average Particle Diameter (D4) of Toner

The weight-average particle diameter (D4) of the toner is calculated in the manner described below. An apparatus for precisely measuring particle size distribution using a pore electrical resistance method, which is provided with a tube having an aperture of 100 μm (a Coulter Counter Multisizer 3 (registered trademark) produced by Beckman Coulter, Inc.) is used as the measurement apparatus. Settings for measurement conditions and analysis of measured data are carried out using dedicated software for the measurement apparatus (Beckman Coulter Multisizer 3 Version 3.51 produced by Beckman Coulter, Inc.). Moreover, measurements are carried out using 25,000 effective measurement channels. A solution obtained by dissolving special grade sodium chloride in ion exchanged water at a concentration of 1 mass %, such as "ISOTON II" (produced by Beckman Coulter), can be used as an aqueous electrolyte solution used in the measurements.

Moreover, dedicated software was set up as follows before carrying out measurements and analysis. On the "Standard Operating Method (SOMME) alteration" screen in the dedicated software, the total count number in control mode is set to 50,000 particles, the number of measurements is set to 1, and the Kd value is set to "standard particle 10.0 μm" (Beckman Coulter). By pressing the "Threshold value/noise level measurement button", threshold values and noise levels are automatically set. In addition, the current is set to 1600 μA, the gain is set to 2, the electrolyte solution is set to ISOTON II, and the "Flush aperture tube after measurement" option is checked. On the "Conversion settings from pulse to particle diameter" screen in the dedicated software, the bin interval is set to logarithmic particle diameter, the particle diameter bin is set to 256 particle diameter bin, and the particle diameter range is set to from 2 μm to 60 μm. The specific measurement method is as follows.

(1) 200 μmL of the aqueous electrolyte solution is placed in a Multisizer 3 dedicated 250 μmL glass round bottomed beaker, the beaker is set on a sample stand, and a stirring rod is rotated anticlockwise at a rate of 24 rotations/second. By carrying out the "Aperture tube flush" function of the dedicated software, dirt and bubbles in the aperture tube are removed.

(2) 30 μmL of the aqueous electrolyte solution is placed in a 100 μmL glass flat bottomed beaker. Approximately 0.3 μmL of a diluted liquid, which is obtained by diluting "Contaminon N" (a 10 μmass % aqueous solution of a neutral detergent for cleaning precision measurement equipment, which has a pH of 7 and comprises a non-ionic surfactant, an anionic surfactant and an organic builder, produced by Wako Pure Chemical Industries, Ltd.) 3-fold with deionized water, is added to the beaker as a dispersant.

(3) An ultrasonic wave disperser (Ultrasonic Dispersion System Tetra 150 produced by Nikkaki Bios Co., Ltd.) having an electrical output of 120 W, in which 2 oscillators having an oscillation frequency of 50 kHz are housed so that their phases are staggered by 1800 is prepared. 3.3 L of ion exchanged water is placed in a water bath in the ultrasonic dispersion system, and 2 μmL of Contaminon N is added to this water bath.

(4) The beaker mentioned in step (2) above is placed in a beaker-fixing hole in the ultrasonic wave disperser, and the ultrasonic wave disperser is activated. The height of the beaker is adjusted so that the resonant state of the liquid surface of the aqueous electrolyte solution in the beaker is at a maximum.

(5) While the aqueous electrolyte solution in the beaker mentioned in section (4) above is being irradiated with ultrasonic waves, 10 μmg of toner is added a little at a time to the aqueous electrolyte solution and dispersed therein. The ultrasonic wave dispersion treatment is continued for a further 60 seconds. Moreover, when carrying out the ultrasonic wave dispersion, the temperature of the water bath is adjusted as appropriate to a temperature of from 10° C. to 40° C.

(6) The aqueous electrolyte solution mentioned in section (5) above, in which the toner is dispersed, is added dropwise by means of a pipette to the round bottomed beaker mentioned in section (1) above, which is disposed on the sample stand, and the measurement concentration is adjusted to 5%. Measurements are carried out until the number of particles measured reaches 50000.

(7) The weight-average particle diameter (D4) is calculated by analyzing measurement data using the accompanying dedicated software. Moreover, when setting the graph/vol. % with the dedicated software, the "average diameter" on the "Analysis/volume-based statistical values (arithmetic mean)" screen is weight-average particle diameter (D4).

Method for Measuring an Endothermic Quantity ΔH Derived from a Crystalline Vinyl Resin, and Melting Point, by Differential Scanning Calorimetry (DSC) of Toner An endothermic quantity ΔH derived from a crystalline vinyl resin is measured using DSC Q2000 (by TA Instruments Inc.) under the following conditions.

Ramp rate: 10° C./min

Measurement start temperature: 20° C.

Measurement end temperature: 180° C.

The melting points of indium and zinc are used for temperature correction in the detection unit of the device, and the heat of fusion of indium is used for correcting the amount of heat.

Specifically, 5 μmg of a sample are weighed exactly, are placed in an aluminum pan, and a differential scanning calorimetric measurement is performed. An empty pan made of silver is used as a reference. The temperature rise process involves raising the temperature to 180° C. at a rate of 10° C./min. A peak temperature and an endothermic quantity are calculated from the peaks.

If when using a toner as the sample a maximum endothermic peak, i.e. the endothermic peak deemed to derive from the crystalline vinyl resin, does not overlap with another endothermic peak, such as that of a release agent, then it suffices to work out the endothermic quantity ΔH by treating the temperature at the maximum endothermic peak as the melting point of the crystalline vinyl resin.

In a case by contrast where another endothermic peak, such as that of a release agent, overlaps the maximum endothermic peak, the endothermic quantity derived for instance from the release agent must be subtracted from the maximum endothermic peak.

For instance, an endothermic peak derived from the crystalline vinyl resin can be obtained through subtraction of the endothermic quantity derived from the release agent, from the maximum endothermic peak, in accordance with the method below.

Firstly, a separate DSC measurement is performed on the release agent alone, to work out endothermic characteristics. The content of the release agent in the toner is determined next. The release agent content in the toner can be measured in accordance with known structural analysis. Thereafter, it suffices that the endothermic quantity derived from the release agent be calculated from the content of the release agent in the toner, and the calculated endothermic quantity amount be subtracted from the maximum endothermic peak.

In a case where the release agent is readily inter-soluble with the binder resin component (crystalline vinyl resin and amorphous resin), it is necessary to calculate, and thereupon subtract, the endothermic quantity derived from the release agent, through multiplication of the content of the release agent by an inter-solubility rate thereof. Firstly there is worked out the endothermic quantity A of a mixture A resulting from melt-mixing of the molten mixture of the binder resin component and the release agent, at the same ratio as the content ratio of the release agent in the toner. The inter-solubility rate is calculated from a value resulting from dividing the endothermic quantity A by a theoretical endothermic quantity of the mixture A, calculated in turn from the endothermic quantity of the molten mixture of the binder resin component and the endothermic quantity of the release agent alone, as worked out beforehand.

Theoretical endothermic quantity of mixture $A$=Endothermic quantity of molten mixture alone of binder resin component+endothermic quantity of release agent alone.

Inter-solubility rate=endothermic quantity $A$/theoretical endothermic quantity of mixture $A$ Endothermic quantity derived from release agent=endothermic quantity of release agent alone×content of release agent in mixture $A$×inter-solubility rate Endothermic quantity of crystalline vinyl resin=endothermic quantity of toner−endothermic quantity derived from release agent.

The endothermic quantity ΔH, from a temperature 20.0° C. lower than the corresponding endothermic peak temperature up to a temperature 10.0° C. higher than the endothermic peak temperature, is calculated using DSC analysis software.

In a case where there is used a release agent or a crystalline vinyl resin having been separated from the toner, the foregoing can be separated in accordance with the procedure described below in the section "Method for Separating a Crystalline Vinyl Resin and an Amorphous Resin from the Toner".

Measurement Method in Time-of-Flight Secondary Ion Mass Spectrometry (TOF-SIMS) of a Toner Particle Herein a TOF-SIMS analysis measurement of a toner particle is performed using a toner particle obtained through removal of an external additive from the toner, in accordance with the method below. Herein nanoTOF by ULVAC-PHI, Inc. is used for measuring ion amounts (peak intensities) by TOF-SIMS.

Analysis conditions are as follows.

Sample preparation: toner particle adhered to an indium sheet.

Sample pretreatment: none

Primary ions: $Bi_3^{++}$ ions

Acceleration voltage: 30 kV

Charge neutralization mode: on

Measurement mode: positive

Raster: 300 μm

Measurement time: 180 s

Ordinarily, TOF-SIMS is a surface analysis method, with the data in the depth direction being about 1 nm-data. Accordingly, intensity inside the toner particle is measured through sputtering of the toner particle with argon gas cluster ions, and by shaving the surface. In a depth measurement, a PMMA standard sample film is sputtered beforehand, under the same conditions, to ascertain a relationship with irradiation time.

The sputtering conditions resorted to herein are as follows.

Acceleration voltage: 5 kV

Current: 6.0 nA

Raster: 400 μm

Irradiation time: 5 s

Herein there was used a PMMA standard sample film produced by ULVAC-PHI Inc. It was found that, under these sputtering conditions, the PMMA standard sample film was shaved by 100 nm over 75 sputtering runs; accordingly, the TOF-SIMS analysis was performed while the PMMA standard sample film was sputtered up to 75 times.

Method for Calculating $A(d_{max})/A(100)$

According to standard software (Win Cadence) by ULVAC-PHI Inc., a total count of 252 to 420 which is the mass number of Formula (A) is taken as the ion amount (secondary ion mass/secondary ion charge number (m/z)) of Structural formula (A), and a value resulting from dividing the obtained value by the total ion amount counted in the measurement of the toner is taken as a standard value.

Herein A(100) is a standard value measured upon 75 sputtering runs under the above conditions. In standard values measured upon 0 to 74 sputtering runs, peaks are defined as instances exhibiting a value larger than the value of A(100), and being at least 1.1 times the value of A(100), with $A(d_{max})$ being the maximum peak among such peaks. Thereupon $A(d_{max})/A(100)$ is calculated on the basis of the obtained A(100) and $A(d_{max})$.

Removal of the External Additive

Herein 160 g of sucrose (by Kishida Chemical Co., Ltd.) are added to 100 μmL of ion-exchanged water and dissolved therein while being warmed in a hot water bath, to prepare a sucrose concentrate. Thereupon 31 g of this sucrose concentrate and 6 μmL of Contaminon N (10 μmass % aqueous solution of a pH-7 neutral detergent for cleaning of precision measuring instruments, made up of a nonionic surfactant, an anionic surfactant and an organic builder, by Wako Pure Chemical Industries, Ltd.) are introduced into a centrifuge tube, to produce a dispersion. Then 1 g of toner is added to this dispersion, and toner clumps are broken up using a spatula or the like.

The centrifuge tube is shaken for 30 μminutes in a shaker ("KM Shaker" (model: V.SX) by Iwaki Industry Co., Ltd.) at 350 strokes per minute. After shaking, the resulting solution is transferred to a glass tube (50 μmL) for swing rotors, and is centrifuged under conditions of 58.33 $s^{-1}$ for 30 μminutes, using a centrifuge (H-9R, by Kokusan Co., Ltd.). In the glass tube after centrifugation there are present the toner particle, at the topmost layer, and the external additive, on the aqueous solution side of the lower layer. The toner particle in the topmost layer is collected, filtered, and washed with 2 L of ion-exchanged water warmed to 40° C., and the washed toner particle is retrieved.

Method for Measuring the Molecular Weight of Toner and Crystalline Vinyl Resins

The molecular weight (weight average molecular weight (Mw)) of the THF-soluble fraction of the toner and crystalline vinyl resins is measured by means of gel permeation chromatography (GPC), in the manner described below. First, a sample is dissolved in tetrahydrofuran (THF) at room temperature over a period of 24 hours. A sample solution is then obtained by filtering the obtained solution using a solvent-resistant membrane filter having a pore diameter of 0.2 μm (a "Mishoridisk" produced by Tosoh Corporation). Moreover, the sample solution is adjusted so that the concentration of THF-soluble components is 0.8 μmass %. Measurements are carried out using this sample solution under the following conditions.

Apparatus: HLC8120 GPC (detector: RI) (produced by Tosoh Corporation)

Column: Combination of Shodex KF-801, 802, 803, 804, 805, 806 and 807 (produced
by Showa Denko Kabushiki Kaisha)

Eluant: Tetrahydrofuran (THF)

Flow rate: 1.0 μmL/min

Oven temperature: 40.0° C.

Injected amount: 0.10 μmL

A molecular weight calibration curve prepared using standard polystyrene resin (for example, product name: TSK standard polystyrene F-850, F-450, F-288, F-128, F-80, F-40, F-20, F-10, F-4, F-2, F-1, A-5000, A-2500, A-1000, A-500, Tosoh Corp.) is used for calculating the molecular weights of the samples.

Method for Separating Crystalline Vinyl Resins A and B, and an Amorphous Resin, from Toner The crystalline vinyl resins A and B and the amorphous resin can be separated from the toner in accordance with known methods, an example of which is illustrated below.

Gradient LC is used as a method for separating resin components from the toner. In this analysis, resins in the binder resin can be separated on the basis of polarity, regardless of the molecular weights of the resins. First, the toner is dissolved in chloroform. A sample is prepared so that the sample concentration in chloroform is 0.1 μmass %, and this solution is filtered using a 0.45 μm PTFE filter and then subjected to measurements. Gradient polymer LC measurement conditions are as follows.

Apparatus: ULTIMATE 3000 (produced by Thermo Fisher Scientific)

Mobile phase: A: chloroform (HPLC), B: acetonitrile (HPLC)

Gradient: 2 μmin (A/B=0/100)→25 μmin (A/B=100/0)

Moreover, the gradient of the change in mobile phase was linear.

Flow rate: 1.0 μmL/min

Injected amount: 0.1 μmass %×20 μL

Column: Tosoh TSKgel ODS (4.6 mmϕ×150 mm×5 μm)

Column temperature: 40° C.

Detector: Corona charged particle detector (Corona-CAD) (produced by Thermo Fisher Scientific)

Resin component peaks can be separated, according to polarity, in a time-intensity graph obtained through measurement. Thereafter, the above measurement is performed once more, whereupon the resin can be separated through fraction separation at troughs of respective peaks. The separated resin is subjected to a DSC measurement, such that a resin having a melting point peak is deemed to be a crystalline vinyl resin, while a resin having no melting point is deemed to be an amorphous resin.

In the below-described examples a separated crystalline vinyl resin was subjected to acid value measurement; a resin having an acid value lower than of 0.5 mgKOH/g was deemed to be a crystalline vinyl resin A, and a resin having an acid value of 0.5 μmgKOH/g or higher was deemed to be a crystalline vinyl resin B. A method for measuring acid value will be described below.

Moreover, in a case where the toner contains a release agent, it is essential to separate the release agent from the toner. Separation of the release agent involves separating a component having a molecular weight of 2000 or less as a release agent by means of recycling HPLC. The measurement method is as follows. First, a chloroform solution of the toner is produced using the method described above. A sample solution is then obtained by filtering the obtained solution using a solvent-resistant membrane filter having a pore diameter of 0.2 μm (a "Mishoridisk" produced by Tosoh Corporation). Moreover, the sample solution is adjusted so that the concentration of chloroform-soluble components is 1.0 μmass %. Measurements are carried out using this sample solution under the following conditions.

Apparatus: LC-Sakura NEXT (Japan Analytical Industry Co., Ltd.)

Column: JAIGEL 2H, 4H (Japan Analytical Industry Co., Ltd.)

Eluant: Chloroform

Flow rate: 10.0 μmL/min

Oven temperature: 40.0° C.

Injected amount: 1.0 μmL

When calculating the molecular weight of the sample, a molecular weight calibration curve is prepared using standard polystyrene resins (for example, product names "TSK Standard Polystyrene F-850, F-450, F-288, F-128, F-80, F-40, F-20, F-10, F-4, F-2, F-1, A-5000, A-2500, A-1000 and A-500", produced by Tosoh Corporation).

The release agent is removed from the toner by repeatedly isolating components having molecular weights of 2000 or less from the thus obtained molecular weight curve.

Method for Measuring Content Ratio of Various Monomer Units in Resin

The content ratio of various monomer units in the resin is measured by $^{1}$H-NMR under the following conditions.

Measuring device: FT NMR device JNM-EX400 (manufactured by JEOL Ltd.)

Measurement frequency: 400 MHz

Pulse condition: 5.0 s

Frequency range: 10500 Hz

Cumulative number: 64 times

Measurement temperature: 30° C.

Sample: 50 μmg of a measurement sample is placed in a sample tube having an internal diameter of 5 mm, deuterated chloroform ($CDCl_3$) is added as a solvent, and the measurement sample is dissolved in a constant temperature bath at 40° C. The obtained $^{1}$H-NMR chart is analyzed and the structures of the monomer units are identified. As an example, measurement of the content of the monomer unit (a) in the crystalline vinyl resin A will now be described. From among peaks attributable to constituent elements of the monomer unit (a) in an obtained $^{1}$H-NMR chart, a peak that is independent from peaks attributable to constituent elements of other monomer units is selected, and the integrated value S1 of this peak is calculated. Integrated values are calculated in the same way for other monomer units contained in the crystalline vinyl resin A.

In a case where monomer units that constitute the crystalline vinyl resin A are the monomer unit (a) and one other monomer unit, the content of the monomer unit (a) is determined in the manner shown below using the integrated value S1 above and an integrated value S2 of the other monomer unit. Moreover, n1 and n2 denote the number of hydrogens in constituent elements attributable to peaks observed for the respective segments.

$$\text{Content (mol \%) of monomer unit } (a)=\{(S1/n1)/((S1/n1)+(S2/n2))\}\times 100$$

In cases where the number of other monomer units is 2 or more, the content of the monomer unit (a) can be calculated in the same way.

Moreover, in cases where a polymerizable monomer in which hydrogen is not contained in constituent elements other than vinyl groups is used, $^{13}$C-NMR measurements are carried out in single pulse mode using $^{13}$C as a measurement atomic nucleus, and calculations are carried out in the same way as in $^{1}$H-NMR measurements. Content values of monomer units can be converted into mass percentages by multiplying the proportions (mol %) of the monomer units, which have been calculated using the method described above, by the molecular weights of these monomer units.

Also the amorphous resin is measured in accordance with the same method.

Measurement of Acid Value of Resin

Acid value is the mass (mg) of potassium hydroxide required to neutralize acid contained in 1 g of a sample. The acid value of a resin is measured in accordance with JIS K 0070-1992, but is specifically measured using the following procedure.

(1) Reagent Preparation

A phenolphthalein solution is obtained by dissolving 1.0 g of phenolphthalein in 90 μmL of ethyl alcohol (95 vol. %) and adding ion exchanged water up to a volume of 100 μmL. 7 g of special grade potassium hydroxide is dissolved in 5 μmL of water, and ethyl alcohol (95 vol. %) is added up to a volume of 1 L. A potassium hydroxide solution is obtained by placing the obtained solution in an alkali-resistant container so as not to be in contact with carbon dioxide gas or the like, allowing solution to stand for 3 days, and then filtering. The obtained potassium hydroxide solution is stored in the alkali-resistant container. The factor of the potassium hydroxide solution is determined by placing 25 μmL of 0.1 μmol/L hydrochloric acid in a conical flask, adding several drops of the phenolphthalein solution, titrating with the potassium hydroxide solution, and determining the factor from the amount of the potassium hydroxide solution required for neutralization. The 0.1 μmol/L hydrochloric acid is produced in accordance with JIS K 8001-1998.

(2) Operation (A) Main Test 2.0 g of a pulverized sample is measured precisely into a 200 μmL conical flask, 100 μmL of a mixed toluene/ethanol (2:1) solution is added, and the sample is dissolved over a period of 5 hours. Next, several drops of the phenolphthalein solution are added as an indicator, and titration is carried out using the potassium hydroxide solution. Moreover, the end-point of the titration is deemed to be the point when the pale crimson color of the indicator is maintained for 30 seconds.

(B) Blank Test

Titration is carried out in the same way as in the operation described above, except that the sample is not used (that is, only a mixed toluene/ethanol (2:1) solution is used).

(3) The acid value is calculated by inputting the obtained results into the formula below.

$$A=[(C-B)\times f\times 5.61]/S$$

Here, A denotes the acid value (mg KOH/g), B denotes the added amount (mL) of the potassium hydroxide solution in the blank test, C denotes the added amount (mL) of the potassium hydroxide solution in the main test, f denotes the factor of the potassium hydroxide solution, and S denotes the mass (g) of the sample.

Measurement of the Content Ratios of Crystalline Vinyl Resins, Crystalline Vinyl Resin A, Crystalline Vinyl Resin B and an Amorphous Resin The content ratios of a crystalline vinyl resin, the crystalline vinyl resin A, the crystalline vinyl resin B, and amorphous resin in the toner are calculated relying on the above separation in a gradient polymer LC measurement. Specifically, the weight of each resin obtained is measured and divided by toner weight.

EXAMPLES

Hereinafter, the present invention will be specifically described with reference to Examples, but these do not limit the present invention in any way. In the following formulations, parts are based on mass unless otherwise specified.

Preparation of Crystalline Vinyl Resin A1

The following materials were charged, under a nitrogen atmosphere, into a reaction vessel equipped with a reflux condenser, a stirrer, a thermometer and a nitrogen inlet tube.

| | |
|---|---|
| Toluene | 100.0 parts |
| Monomer composition | 100.0 parts |
| (The monomer composition is a mixture of the following monomers, in the proportions given below) | |
| (Behenyl acrylate (monomer (a)) | 70.0 parts) |
| (Styrene | 12.0 parts) |
| (Methacrylonitrile | 18.0 parts) |
| Polymerization initiator t-butyl peroxypivalate (by NOF Corporation: Perbutyl PV) | 0.5 parts |

A polymerization reaction was carried out for 12 hours, through heating at 70° C. while the interior of the reaction vessel was stirred at 200 rpm, to obtain a solution in which a polymer of the monomer composition was dissolved in toluene. Subsequently, the temperature of the solution was lowered to 25° C. and then the solution was added to 1000.0 parts of methanol, while under stirring, to elicit precipitation of a methanol-insoluble fraction. The obtained methanol-insoluble fraction was filtered off, was further washed with methanol, and was thereafter vacuum-dried at 40° C. for 24 hours, to yield Crystalline vinyl resin A1. The obtained Crystalline vinyl resin A1 had a weight-average molecular weight (Mw) of 30000 and a melting point of 60° C.

Preparation of Crystalline Vinyl Resins A2 to A15

Except for modifying herein the addition amount of the monomer composition to that given in Table 1 and controlling the molecular weight on the basis of the amount of polymerization initiator, Crystalline vinyl resins A2 to A15 were prepared otherwise in the same way as in the preparation of Crystalline vinyl resin A1.

TABLE 1

| | Monomer (a) | | | Other monomers 1 | | Other monomers 2 | | |
|---|---|---|---|---|---|---|---|---|
| Crystalline resin A | Type | Carbon number n | Addition amount (parts) | Type | Addition amount (parts) | Type | Addition amount (parts) | Physical properties Mw |
| Crystalline vinyl resin A1 | Behenyl acrylate | 21 | 70.0 | Styrene | 12.0 | Methacrylonitrile | 18.0 | 30000 |
| Crystalline vinyl resin A2 | Behenyl acrylate | 21 | 65.0 | Styrene | 17.0 | Methacrylonitrile | 18.0 | 28000 |
| Crystalline vinyl resin A3 | Behenyl acrylate | 21 | 55.0 | Styrene | 27.0 | Methacrylonitrile | 18.0 | 32000 |
| Crystalline vinyl resin A4 | Ceryl acrylate | 25 | 80.0 | Styrene | 2.0 | Methacrylonitrile | 18.0 | 32000 |
| Crystalline vinyl resin A5 | Behenyl acrylate | 21 | 80.0 | Styrene | 2.0 | Methacrylonitrile | 18.0 | 31000 |
| Crystalline vinyl resin A6 | Behenyl acrylate | 21 | 80.0 | Styrene | 8.0 | Methacrylonitrile | 12.0 | 30000 |
| Crystalline vinyl resin A7 | Behenyl acrylate | 21 | 50.0 | Styrene | 32.0 | Methacrylonitrile | 18.0 | 24000 |
| Crystalline vinyl resin A8 | Behenyl acrylate | 21 | 90.0 | Styrene | 0.0 | Methacrylonitrile | 10.0 | 31000 |
| Crystalline vinyl resin A9 | Behenyl acrylate | 21 | 45.0 | Styrene | 37.0 | Methacrylonitrile | 18.0 | 23000 |
| Crystalline vinyl resin A10 | Myricyl acrylate | 29 | 70.0 | Styrene | 12.0 | Methacrylonitrile | 18.0 | 32000 |

TABLE 1-continued

| | Monomer (a) | | | Other monomers 1 | | Other monomers 2 | | |
|---|---|---|---|---|---|---|---|---|
| Crystalline resin A | Type | Carbon number n | Addition amount (parts) | Type | Addition amount (parts) | Type | Addition amount (parts) | Physical properties Mw |
| Crystalline vinyl resin A11 | Arachidyl acrylate | 19 | 60.0 | Styrene | 22.0 | Methacrylonitrile | 18.0 | 26000 |
| Crystalline vinyl resin A12 | Stearyl acrylate | 17 | 60.0 | Styrene | 22.0 | Methacrylonitrile | 18.0 | 45000 |
| Crystalline vinyl resin A13 | Stearyl acrylate | 17 | 70.0 | Styrene | 30.0 | Methacrylonitrile | 0.0 | 46000 |
| Crystalline vinyl resin A14 | Behenyl acrylate | 21 | 100.0 | Styrene | 0.0 | Methacrylonitrile | 0.0 | 30000 |
| Crystalline vinyl resin A15 | Behenyl acrylate | 21 | 60.0 | Styrene | 22.0 | Methacrylonitrile | 18.0 | 26000 |

Preparation of Crystalline Vinyl Resin B1

The following materials were charged, under a nitrogen atmosphere, into a reaction vessel equipped with a reflux condenser, a stirrer, a thermometer and a nitrogen inlet tube.

| | |
|---|---|
| Toluene | 100.0 parts |
| Monomer composition | 100.0 parts |
| (The monomer composition is a mixture of the following monomers, in the proportions given below) | |
| (Behenyl acrylate (monomer (a)) | 70.0 parts) |
| (Styrene | 25.0 parts) |
| (Methacrylic acid (monomer (b)) | 5.0 parts) |
| Polymerization initiator t-butyl peroxypivalate (by NOF Corporation: Perbutyl PV) | 0.5 parts |

A polymerization reaction was carried out for 12 hours, through heating at 70° C. while the interior of the reaction vessel was stirred at 200 rpm, to obtain a solution in which a polymer of the monomer composition was dissolved in toluene. Subsequently, the temperature of the solution was lowered to 25° C. and then the solution was added to 1000.0 parts of methanol, while under stirring, to elicit precipitation of a methanol-insoluble fraction. The obtained methanol-insoluble fraction was filtered off, was further washed with methanol, and was thereafter vacuum-dried at 40° C. for 24 hours, to yield Crystalline vinyl resin B1. The obtained Crystalline vinyl resin B1 had a weight-average molecular weight (Mw) of 20000, a melting point of 60° C., and an acid value of 15 μmgKOH/g.

Preparation of Crystalline Vinyl Resins B2 to B8 and Amorphous Resins 1 and 2

Except for modifying herein the addition amount of the monomer composition to those given in Table 2, Crystalline vinyl resins B2 to B8 and Amorphous resins 1 and 2 were obtained otherwise in the same way as in the preparation of Crystalline vinyl resin B1.

Preparation of Amorphous Resin 3

| | |
|---|---|
| Propylene oxide adduct of bisphenol A (2.2 mole-addition) | 60.0 parts |
| Ethylene oxide adduct of bisphenol A (2.2 mole-addition) | 40.0 parts |
| Terephthalic acid | 77.0 parts |
| Trimellitic acid | 2.0 parts |

The above polyester monomer mixture, along with 0.05 μmass % of tetraisobutyl titanate relative to the total amount, were charged into a 5 L autoclave. A reflux condenser, a water separator, a nitrogen gas inlet tube, a thermometer and a stirring device were fitted, and a polycondensation reaction was carried out at 230° C. while introducing nitrogen gas into the autoclave. Once the reaction was over, the product was retrieved from the vessel, and was cooled and pulverized, to yield Amorphous resin 3. Amorphous resin 3 had a glass transition temperature Tg of 60° C. and a weight-average molecular weight (Mw) of 26000.

Preparation of Amorphous Resin 4

The following materials were charged, under a nitrogen atmosphere, into a reaction vessel equipped with a reflux condenser, a stirrer, a thermometer and a nitrogen inlet tube.

| | |
|---|---|
| Toluene | 100.0 parts |
| Monomer composition | 100.0 parts |
| (The monomer composition is a mixture of the following monomers, in the proportions given below) | |
| (Butyl acrylate | 25.0 parts) |
| (Styrene | 75.0 parts) |
| Polymerization initiator t-butyl peroxypivalate (by NOF Corporation: Perbutyl PV) | 0.4 parts |

A polymerization reaction was carried out for 12 hours, through heating at 70° C. while the interior of the reaction

TABLE 2

| | Monomer (a) | | | Other monomers 1 | | Other monomers 2 | | Physical properties | |
|---|---|---|---|---|---|---|---|---|---|
| Crystalline resin B | Type | Carbon number n | Addition amount (parts) | Type | Addition amount (parts) | Type | Addition amount (parts) | Mw | Acid value mgKOH/g |
| Crystalline vinyl resin B1 | Behenyl acrylate | 21 | 70.0 | Styrene | 25.0 | Methacrylic acid | 5.0 | 20000 | 15 |
| Crystalline vinyl resin B2 | Behenyl acrylate | 21 | 90.0 | Styrene | 7.0 | Methacrylic acid | 3.0 | 25000 | 10 |
| Crystalline vinyl resin B3 | Behenyl acrylate | 21 | 85.0 | Styrene | 10.0 | Methacrylic acid | 5.0 | 22000 | 15 |
| Crystalline vinyl resin B4 | Behenyl acrylate | 21 | 70.0 | Styrene | 28.0 | Methacrylic acid | 2.0 | 20000 | 7 |
| Crystalline vinyl resin B5 | Behenyl acrylate | 21 | 60.0 | Styrene | 33.5 | Methacrylic acid | 6.5 | 20000 | 20 |
| Crystalline vinyl resin B6 | Behenyl acrylate | 21 | 60.0 | Styrene | 30.0 | Methacrylic acid | 10.0 | 21000 | 30 |
| Crystalline vinyl resin B7 | Behenyl acrylate | 21 | 80.0 | Styrene | 15.0 | Methacrylic acid | 5.0 | 21000 | 15 |
| Crystalline vinyl resin B8 | Behenyl acrylate | 17 | 70.0 | Styrene | 28.0 | Methacrylic acid | 2.0 | 27000 | 7 |
| Amorphous resin 1 | Behenyl acrylate | 21 | 30.0 | Styrene | 65.0 | Methacrylic acid | 5.0 | 22000 | 15 |
| Amorphous resin 2 | Butyl acrylate | 3 | 20.0 | Styrene | 75.0 | Methacrylic acid | 5.0 | 15000 | 15 |

vessel was stirred at 200 rpm, to obtain a solution in which a polymer of the monomer composition was dissolved in toluene. Subsequently, the temperature of the solution was lowered to 25° C. and then the solution was added to 1000.0 parts of methanol, while under stirring, to elicit precipitation of a methanol-insoluble fraction. The obtained methanol-insoluble fraction was separated by filtration, was washed with methanol, and was vacuum-dried at 40° C. for 24 hours, to yield Amorphous resin 4. Amorphous resin 4 had a glass transition temperature Tg of 60° C. and a weight-average molecular weight (Mw) of 50000.

Production of Toner 1

Production of Toner by Suspension Polymerization

Preparation of Toner Particle 1

A mixture was prepared that was made up of:

| | |
|---|---|
| Butyl acrylate | 15.0 parts |
| Styrene | 45.0 parts |
| Colorant Pigment Blue 15:3 | 6.5 parts |

The above mixture was placed in attritor (by Nippon Coke & Engineering Co., Ltd.), and was dispersed at 200 rpm for 2 hours using zirconia beads having a diameter of 5 mm, to yield a starting material dispersion.

Meanwhile, 735.0 parts of ion-exchanged water and 16.0 parts of trisodium phosphate (dodecahydrate) were added into a container equipped with a high-speed stirrer homomixer (by Primix Corporation) and a thermometer, and the temperature was raised to 60° C. while under stirring at 12000 rpm. An aqueous solution of calcium chloride resulting from dissolving 9.0 parts of calcium chloride (dihydrate) in 65.0 parts of ion-exchanged water was further added, with stirring for 30 μminutes at 12000 rpm while the temperature was held at 60° C. Then the pH was adjusted to 6.0 through addition of 10% hydrochloric acid, to yield an aqueous medium in which an inorganic dispersion stabilizer containing hydroxyapatite was dispersed in water.

Subsequently, the starting material dispersion was transferred to a container equipped with a stirrer and a thermometer, and the temperature was raised to 60° C. while under stirring at 100 rpm. To this medium there were added:

| | |
|---|---|
| Crystalline vinyl resin A1 | 40.0 parts |
| Crystalline vinyl resin B1 | 5.0 parts |
| Release agent 1 | 9.0 parts |

(Release agent 1: DP18 (dipentaerythritol stearate wax, melting point 79° C., by Nisshin OilliO Group, Ltd.), and the whole was stirred at 100 rpm for 30 μminutes while the temperature was kept at 60° C.; thereafter, 5.0 parts of t-butyl peroxypivalate (Perbutyl PV, by NOF Corporation) as a polymerization initiator were added, with further stirring for 1 μminute, followed by charging into an aqueous medium stirred at 12000 rpm, in the above high-speed stirring device. Stirring was continued at 12000 rpm for 20 μminutes in the high-speed stirring device, while the temperature was held at 60° C., to yield a granulation liquid.

This granulation liquid was transferred to a reaction vessel equipped with a reflux condenser, a stirrer, a thermometer and a nitrogen inlet tube, and was heated at 70° C. in a nitrogen atmosphere while under stirring at 150 rpm. A polymerization reaction was performed at 150 rpm for 12 hours while the temperature was maintained at 70° C., to yield a toner particle dispersion.

The obtained toner particle dispersion was cooled down to 45° C. while under stirring at 150 rpm, and was thereafter thermally treated for 5 hours while the temperature was kept at 45° C. Dilute hydrochloric acid was thereafter added, while under continued stirring, until the pH dropped to 1.5, to dissolve a dispersion stabilizer. The solid fraction was separated by filtration, and was thoroughly washed with ion-exchanged water, followed by vacuum drying at 30° C. for 24 hours, to yield Toner particle 1.

Preparation of Toner 1

To 98.0 parts of Toner particle 1 above there were added 2.0 parts of silica fine particles (hydrophobized with hexamethyldisilazane, number-average particle diameter of primary particles: 10 nm, BET specific surface area: 170 $\mu m^2/g$), as an external additive, and the whole was mixed at 3000 rpm for 15 μminutes using a Henschel mixer (by Nippon Coke & Engineering Co., Ltd.), to yield Toner 1.

The obtained Toner 1, which was analyzed in accordance with the above methods, proved to have a weight-average particle diameter (D4) of 7.0 μm, an endothermic quantity ΔH of 30 J/g, and a weight-average molecular weight (Mw) of 100000. Further, a TOF-SIMS analysis yielded $A(d_{max})/A(100)$ of 3.2, with a peak position ($d_{max}$) of Formula (A) at 40 nm from the toner particle surface (30 sputtering runs). Measurements of the amounts of the resins in the toner particle and the monomer units in the crystalline vinyl resins of the obtained toner revealed that the respective content ratios were identical to those charged. The results are given in Table 4.

TABLE 3

| | | Binder resin | | | | | |
|---|---|---|---|---|---|---|---|
| | | Crystalline resin A | | Crystalline resin B | | Amorphous resin | |
| | | Crystalline | | Crystalline | | Added polymer | |
| Toner No. | Production method | vinyl resin No. | Addition amount (parts) | vinyl resin No. | Addition amount (parts) | Amorphous resin No. | Addition amount (parts) |
| 1 | SP | A1 | 40.0 | B1 | 5.0 | — | — |
| 2 | SP | A2 | 30.0 | B2 | 5.0 | — | — |
| 3 | SP | A3 | 25.0 | B2 | 8.0 | — | — |
| 4 | SP | A4 | 65.0 | B3 | 6.0 | — | — |
| 5 | SP | A1 | 40.0 | B4 | 15.0 | — | — |
| 6 | SP | A1 | 40.0 | B4 | 20.0 | — | — |
| 7 | SP | A1 | 40.0 | B5 | 2.0 | — | — |
| 8 | SP | A1 | 40.0 | B6 | 1.3 | — | — |
| 9 | SP | A5 | 65.0 | B5 | 6.0 | 3 | 15.0 |

TABLE 3-continued

| | | | | | | | |
|---|---|---|---|---|---|---|---|
| 10 | SP | A6 | 20.0 | B5 | 5.0 | — | — |
| 11 | SP | A6 | 15.0 | B5 | 5.0 | — | — |
| 12 | SP | A6 | 10.0 | B7 | 5.0 | — | — |
| 13 | SP | A7 | 10.0 | B3 | 8.0 | — | — |
| 14 | SP | A8 | 5.0 | B2 | 8.0 | — | — |
| 15 | SP | A6 | 78.0 | B6 | 5.0 | — | — |
| 16 | SP | A8 | 80.0 | B2 | 5.0 | — | — |
| 17 | SP | A7 | 30.0 | B5 | 5.0 | — | — |
| 18 | SP | A9 | 40.0 | B5 | 5.0 | — | — |
| 19 | SP | A10 | 15.0 | B5 | 5.0 | — | — |
| 20 | SP | A11 | 75.0 | B5 | 5.0 | — | — |
| 21 | EA | A12 | 85.0 | B5 | 10.0 | 4 | 15.0 |
| C. 1 | EA | A13 | 100.0 | B8 | 25.0 | — | — |
| C. 2 | SP | A6 | 90.0 | — | — | 1 | 9.0 |
| C. 3 | SP | A14 | 40.0 | — | — | 2 | 9.0 |
| C. 4 | SP | A6 | 60.0 | B5 | 1.0 | — | — |
| C. 5 | SP | A1 | 40.0 | B5 | 25.0 | — | — |
| C. 6 | SP | A7 | 5.0 | B6 | 8.0 | — | — |
| C. 7 | SP | A15 | 10.0 | B5 | 5.0 | — | — |
| C. 8 | SP | A8 | 90.0 | B6 | 5.0 | — | — |
| C. 9 | P | A3 | 50.0 | B2 | 5.0 | 4 | 50.0 |

| | Binder resin Amorphous resin | | | | | | |
|---|---|---|---|---|---|---|---|
| | Polymerizable monomer X | | | Polymerizable monomer Y | | Crosslinking agent | |
| Toner No. | Type | Carbon number p | Addition amour (parts) | Type | Addition amount (parts) | Type | Addition amount (parts) |
| 1 | n-butyl acrylate | 3 | 15.0 | Styrene | 45.0 | — | — |
| 2 | Lauryl acrylate | 11 | 17.5 | Styrene | 52.5 | — | — |
| 3 | n-butyl acrylate | 3 | 18.8 | Styrene | 56.3 | — | — |
| 4 | n-butyl acrylate | 3 | 8.8 | Styrene | 26.3 | — | — |
| 5 | n-butyl acrylate | 3 | 15.0 | Styrene | 45.0 | — | — |
| 6 | n-butyl acrylate | 3 | 15.0 | Styrene | 45.0 | — | — |
| 7 | n-butyl acrylate | 3 | 15.0 | Styrene | 45.0 | — | — |
| 8 | n-butyl acrylate | 3 | 15.0 | Styrene | 45.0 | — | — |
| 9 | n-butyl acrylate | 3 | 5.0 | Styrene | 15.0 | HDDA | 0.1 |
| 10 | n-butyl acrylate | 3 | 20.0 | Styrene | 60.0 | — | — |
| 11 | n-butyl acrylate | 3 | 21.3 | Styrene | 63.8 | — | — |
| 12 | n-butyl acrylate | 3 | 22.5 | Styrene | 67.5 | — | — |
| 13 | n-butyl acrylate | 3 | 22.5 | Styrene | 67.5 | — | — |
| 14 | n-butyl acrylate | 3 | 23.8 | Styrene | 71.3 | — | — |
| 15 | n-butyl acrylate | 3 | 5.5 | Styrene | 16.5 | — | — |
| 16 | n-butyl acrylate | 3 | 5.0 | Styrene | 15.0 | — | — |
| 17 | n-butyl acrylate | 3 | 17.5 | Styrene | 52.5 | — | — |
| 18 | n-butyl acrylate | 3 | 15.0 | Styrene | 45.0 | — | — |
| 19 | n-butyl acrylate | 3 | 21.3 | Styrene | 63.8 | — | — |
| 20 | n-butyl acrylate | 3 | 6.3 | Styrene | 18.8 | — | — |
| 21 | — | — | — | — | — | — | — |
| C. 1 | — | — | — | — | — | — | — |
| C. 2 | n-butyl acrylate | 3 | 2.5 | Styrene | 7.5 | — | — |
| C. 3 | n-butyl acrylate | 3 | 15.0 | Styrene | 45.0 | — | — |
| C. 4 | n-butyl acrylate | 3 | 10.0 | Styrene | 30.0 | — | — |
| C. 5 | n-butyl acrylate | 3 | 15.0 | Styrene | 45.0 | — | — |
| C. 6 | n-butyl acrylate | 3 | 23.8 | Styrene | 71.3 | — | — |
| C. 7 | n-butyl acrylate | 3 | 22.5 | Styrene | 67.5 | — | — |
| C. 8 | n-butyl acrylate | 3 | 2.5 | Styrene | 7.5 | — | — |
| C. 9 | — | — | — | — | — | — | — |

In the Table 3, “SP” indicates “Suspension polymerization”, “EA” indicates “Emulsification aggregation”, and “P” indicates “Pulverization”.

“C.” indicates “Comparison”.

TABLE 4

| | Physical properties | | | | | | | | | |
|---|---|---|---|---|---|---|---|---|---|---|
| Toner No. | D 4 μm | ΔH J/g | A(dmax)/ A(100) | dmax (nm) | Amount of crystalline vinyl resin (mass %) | Ratio (a) (mass %) | Amount of crystalline vinyl resin B (mass %) | Amount of amorphous resin (mass %) | Amount of amorphous vinyl resin (mass %) | Mw |
| 1 | 7.0 | 30 | 3.2 | 40 | 37.3 | 70.0 | 4.1 | 49.8 | 49.8 | 100000 |
| 2 | 7.5 | 23 | 5.5 | 42 | 29.0 | 68.6 | 4.1 | 58.1 | 58.1 | 110000 |
| 3 | 6.0 | 18 | 7.5 | 53 | 26.7 | 63.5 | 6.5 | 60.7 | 60.7 | 120000 |
| 4 | 7.5 | 48 | 2.0 | 50 | 58.4 | 80.4 | 4.9 | 28.8 | 28.8 | 80000 |
| 5 | 5.0 | 26 | 3.0 | 70 | 42.1 | 70.0 | 11.5 | 46.0 | 46.0 | 100000 |
| 6 | 5.0 | 26 | 3.0 | 88 | 44.3 | 70.0 | 14.8 | 44.3 | 44.3 | 100000 |
| 7 | 8.5 | 35 | 2.6 | 20 | 35.7 | 69.5 | 1.7 | 51.1 | 51.1 | 100000 |
| 8 | 8.5 | 34 | 2.5 | 13 | 35.4 | 69.7 | 1.1 | 51.4 | 51.4 | 100000 |
| 9 | 7.0 | 47 | 2.1 | 47 | 58.4 | 80.4 | 4.9 | 28.8 | 16.4 | 150000 |
| 10 | 7.0 | 15 | 4.6 | 39 | 20.7 | 76.0 | 4.1 | 66.4 | 66.4 | 130000 |
| 11 | 7.0 | 12 | 6.0 | 39 | 16.6 | 75.0 | 4.1 | 70.5 | 70.5 | 130000 |
| 12 | 7.0 | 10 | 11.5 | 39 | 12.0 | 80.0 | 4.1 | 74.7 | 74.7 | 150000 |
| 13 | 8.0 | 10 | 19.5 | 71 | 14.6 | 56.7 | 6.5 | 72.9 | 72.9 | 150000 |
| 14 | 8.0 | 10 | 27.0 | 71 | 10.5 | 90.0 | 6.5 | 76.9 | 76.9 | 160000 |
| 15 | 7.0 | 56 | 1.7 | 39 | 68.9 | 80.0 | 4.1 | 18.3 | 18.3 | 70000 |
| 16 | 7.0 | 67 | 1.5 | 39 | 70.5 | 90.0 | 4.1 | 16.6 | 16.6 | 70000 |
| 17 | 7.0 | 16 | 4.6 | 39 | 29.0 | 51.4 | 4.1 | 58.1 | 58.1 | 110000 |
| 18 | 7.0 | 17 | 5.0 | 39 | 37.3 | 46.7 | 4.1 | 49.8 | 49.8 | 110000 |
| 19 | 7.0 | 15 | 6.8 | 39 | 16.6 | 67.5 | 4.1 | 70.5 | 70.5 | 140000 |
| 20 | 7.0 | 40 | 1.6 | 39 | 66.4 | 60.0 | 4.1 | 20.7 | 20.7 | 45000 |
| 21 | 7.0 | 45 | 1.5 | 76 | 75.7 | 60.0 | 8.0 | 12.0 | 12.0 | 46000 |
| C. 1 | 7.0 | 61 | No peak | (177) | 89.0 | 70.0 | 17.8 | 0.0 | 0.0 | 75000 |
| C. 2 | 7.0 | 37 | No peak | — | 78.7 | 49.1 | 3.3 | 8.4 | 8.4 | 75000 |
| C. 3 | 7.0 | 33 | No peak | — | 37.3 | 91.1 | 4.1 | 49.8 | 49.8 | 100000 |
| C. 4 | 7.0 | 42 | 1.3 | 8 | 12.0 | 79.7 | 0.9 | 34.3 | 34.3 | 70000 |
| C. 5 | 7.0 | 27 | No peak | (144) | 12.0 | 66.2 | 17.8 | 42.7 | 42.7 | 100000 |
| C. 6 | 8.0 | 7 | 37.0 | 71 | 10.5 | 68.5 | 6.5 | 76.9 | 76.9 | 160000 |
| C. 7 | 7.0 | 7 | 11.0 | 39 | 12.0 | 60.0 | 4.1 | 74.7 | 74.7 | 150000 |
| C. 8 | 7.0 | 72 | 1.2 | 39 | 75.0 | 89.5 | 4.1 | 8.3 | 8.3 | 150000 |
| C. 9 | 6.5 | 18 | No peak | — | 45.6 | 58.2 | 4.1 | 41.5 | 41.5 | 32000 |

In the tables, $d_{max}$ (nm) denotes the depth from the toner particle surface at which $A(d_{max})$ is observed. The "Amount of crystalline vinyl resin", the "Amount of crystalline vinyl resin B", the "Amount of amorphous resin" and the "Amount of amorphous vinyl resin" denote respective content ratios in the toner particle. "Ratio (a)" indicates "Ratio of monomer unit (a) in crystalline vinyl resin (mass %)". "C." indicates "Comparison".

Production of Toners 2 to 8 and 10 to 21

Except for modifying herein the type and amount of the polymerizable monomer that was used, as given in Table 3, Toner particles 2 to 8 and 10 to 21 were obtained otherwise in the same way as in the preparation of Toner particle 1.

The same external addition as in Toner 1 was carried out, to yield Toners 2 to 8 and 10 to 21. Table 4 sets out the physical properties of the toners. Measurements of the amount of each resin in the toner particle and the monomer units in the crystalline vinyl resins of the obtained toner revealed that the respective content ratios were identical to those charged. The results are given in Table 4.

Production of Toner 9

Except for modifying the input of butyl acrylate and styrene as given in Table 3, and adding 0.1 parts of hexanediol diacrylate (HDDA) and amorphous resin 3, at the time of addition of Crystalline vinyl resin A5, Crystalline vinyl resin B5 and Release agent 1, Toner 9 was obtained otherwise in the same way as in the production of Toner 1. Table 4 sets out the physical properties of the obtained Toner 9.

Production of Toner 21

Production of Toner by Emulsification Aggregation

Preparation of a Crystalline Vinyl Resin A12 Dispersion

| | |
|---|---|
| Toluene | 300.0 parts |
| Crystalline vinyl resin A12 | 100.0 parts |

The above materials were weighed, mixed, and dissolved at 90° C.

Separately, 5.0 parts of sodium dodecylbenzene sulfonate and 10.0 parts of sodium laurate were added to 700.0 parts of ion-exchanged water, and the resulting mixture was dissolved through heating at 90° C. Then the above toluene solution and aqueous solution were mixed, with stirring using an ultra-high speed stirring device T. K. Robomix (by Primix Corporation) at 7000 rpm. Further, the resulting mixture was emulsified at a pressure of 200 MPa using a high-pressure impact-type dispersing machine Nanomizer (by Yoshida Kikai Co., Ltd.). Thereafter, toluene was removed using an evaporator, and the concentration was adjusted with ion-exchanged water, to yield a crystalline resin dispersion having a concentration of 20% of Crystalline vinyl resin A12 fine particles.

The 50% particle size (D50), on a volume distribution basis, of the fine particles of Crystalline vinyl resin A12 was measured using a particle size distribution analyzer of dynamic light scattering type, Nanotrac UPA-EX150 (by Nikkiso Co., Ltd.); the result was 0.40 μm.

Preparation of Crystalline Vinyl Resin B5 Dispersion

A Crystalline vinyl resin B5 dispersion having a concentration of 20% of Crystalline vinyl resin B5 fine particles was obtained in the same way as in the preparation of the Crystalline vinyl resin A12 dispersion, but modifying herein Crystalline vinyl resin A12 to Crystalline vinyl resin B5.

The 50% particle size (D50), on a volume distribution basis, of the fine particles of Crystalline vinyl resin B5 was measured using a particle size distribution analyzer of dynamic light scattering type, Nanotrac UPA-EX150 (by Nikkiso Co., Ltd.); the result was 0.40 μm.

Preparation of an Amorphous Resin Dispersion

An amorphous resin dispersion having a concentration of 20% of Amorphous resin 4 fine particles was obtained in the same way as in the preparation of the Crystalline vinyl resin A12 dispersion, but modifying herein Crystalline vinyl resin A12 to Amorphous resin 4.

The 50% particle size (D50), on a volume distribution basis, the amorphous resin fine particles was measured using a particle size distribution analyzer of dynamic light scattering type, Nanotrac UPA-EX150 (by Nikkiso Co., Ltd.); the result was 0.38 μm.

| Preparation of a Release Agent Dispersion | |
|---|---|
| Release agent 1 | 100.0 parts |
| Anionic surfactant Neogen RK (by DKS Co., Ltd.) | 5.0 parts |
| Ion-exchanged water | 395.0 parts |

The above materials were weighed, charged into a mixing vessel equipped with a stirring device, were heated to 90° C., and were caused to circulate in CLEARMIX W-MOTION (by M. Technique Co., Ltd.), to carry out a dispersion treatment for 60 minutes. The conditions in the dispersion treatment were as follows.

| | |
|---|---|
| Rotor outer diameter | 3 cm |
| Clearance | 0.3 mm |
| Rotor rotational speed | 19000 r/min |
| Screen rotational speed | 19000 r/min |

The dispersion treatment was followed by cooling down to 40° C., under cooling processing conditions that included a rotor rotational speed of 1000 r/min, a screen rotational speed of 0 r/min and a cooling rate of 10° C./min, to yield as a result a release agent dispersion having a concentration of 20% of release agent fine particles.

The 50% particle size (D50), on a volume distribution basis, of the release agent fine particles was measured using a particle size distribution analyzer of dynamic light scattering type, Nanotrac UPA-EX150 (by Nikkiso Co., Ltd.); the result was 0.15 μm.

Preparation of a Colorant-Dispersed Solution

| | |
|---|---|
| Colorant (Cyan pigment by Dainichiseika Color & Chemicals Mfg. Co., Ltd.): Pigment Blue 15:3) | 50.0 parts |
| Anionic surfactant Neogen RK (by DKS Co., Ltd.) | 7.5 parts |
| Ion-exchanged water | 442.5 parts |

The above materials were weighed, mixed, dissolved and dispersed for 1 hour using a high-pressure impact disperser Nanomizer (by Yoshida Kikai Co., Ltd.), to yield a colorant-dispersed solution having a concentration of 10% of colorant fine particles resulting from dispersion of the colorant.

The 50% particle size (D50), on a volume distribution basis, of the colorant fine particles was measured using a particle size distribution analyzer of dynamic light scattering type, Nanotrac UPA-EX150 (by Nikkiso Co., Ltd.); the result was 0.20 μm.

Preparation of Toner 21

| | |
|---|---|
| Crystalline vinyl resin A12 dispersion | 425.0 parts |
| Crystalline vinyl resin B5 dispersion | 50.0 parts |
| Amorphous resin dispersion | 75.0 parts |
| Release agent dispersion | 45.0 parts |
| Colorant dispersion | 65.0 parts |
| Ion-exchanged water | 160.0 parts |

The above materials were charged into a round stainless steel flask and were mixed. Subsequently, dispersion was carried out at 5000 r/min for 10 μminutes using a homogenizer Ultra-Turrax T50 (by IKA-Werke GmbH & Co. KG). Then a 1.0% nitric acid aqueous solution was added, to adjust pH to 3.0, followed by heating in a heating water bath up to 58° C. while under appropriate adjustment of the rotational speed, so that the mixed solution was stirred, using a stirring blade.

The volume-average particle diameter of the aggregated particles thus formed was appropriately checked using Coulter Multisizer III; once aggregated particles having a weight-average particle diameter (D4) of 6.0 μm had formed, pH was adjusted to 9.0 using a 5% aqueous solution of sodium hydroxide. This was followed by heating up to 75° C. while under continued stirring. The temperature of 75° C. was held for 1 hour, to elicit fusion of the aggregated particles.

This was followed by cooling down to 45° C., whereupon a thermal treatment was performed for 5 hours.

This was followed by cooling down to 25° C., filtration, solid-liquid separation, and subsequent washing with ion-exchanged water. Once washing was over, the product was dried using a vacuum drier, to yield Toner particle 21.

Toner particle 21 was subjected to external addition in the same way as in the production example of Toner 1, to yield Toner 21. Table 4 sets out the physical properties of Toner 21.

Production of Comparative Toner 1

Preparation of a Crystalline Vinyl Resin A13 Dispersion

A Crystalline vinyl resin A13 dispersion having a concentration of 20% of Crystalline vinyl resin A13 fine particles was obtained in the same way as in the preparation of the Crystalline vinyl resin A12 dispersion, but modifying herein the Crystalline vinyl resin A12 to Crystalline vinyl resin A13.

Preparation of a Crystalline Vinyl Resin B7 Dispersion

A dispersion of Crystalline vinyl resin B7 having a concentration 20% of Crystalline vinyl resin B7 fine particles was obtained in the same way as in the preparation of the Crystalline vinyl resin A12 dispersion, but modifying herein Crystalline vinyl resin A12 to Crystalline vinyl resin B7.

Preparation of Comparative Toner 1

| | |
|---|---|
| Crystalline vinyl resin A13 dispersion | 500.0 parts |
| Crystalline vinyl resin B7 dispersion | 125.0 parts |
| Release agent dispersion | 45.0 parts |
| Colorant-dispersed solution | 65.0 parts |
| Ion-exchanged water | 160.0 parts |

Comparative toner 1 was obtained in the same way as in the preparation of Toner 21, but modifying the charged materials to those above. Herein a TOF-SIMS analysis of Comparative toner 1 revealed no peak of Structural formula (A) even after 75 sputtering runs under the above conditions. A peak was observed at 177 nm after 75 additional sputtering runs (133 sputtering runs).

Production of Comparative Toners 2 to 8

Except for modifying the type and amount of the polymerizable monomers that were used as given in Table 3, Comparative toner particles 2 to 8 were obtained otherwise in the same way as in the preparation of Toner particle 1 in the production of Toner 1.

The same external addition as in Toner 1 was carried out, to yield Comparative toners 2 to 8. Table 4 sets out the physical properties of the toners. In Comparative toners 2 and 3, the maximum amount of Formula (A) was less than 1.1 times that of A(100), and there were no peaks.

Production Example of Comparative Toner 9

| | |
|---|---|
| Crystalline vinyl resin A3 | 50.0 parts |
| Crystalline vinyl resin B2 | 5.0 parts |
| Amorphous resin 4 | 50.0 parts |
| Release agent 1 | 9.0 parts |
| Colorant Pigment Blue 15:3 | 6.5 parts |

The above materials were mixed using a Henschel mixer (Model FM-75, by Nippon Coke & Engineering Co., Ltd.) at a rotational speed of 20 $s^{-1}$ and for a rotation time of 5 μminutes, followed by kneading at a discharge temperature of 120° C. in a twin-screw kneader (PCM-30, by Ikegai Corp.) set to a temperature of 110° C. The resulting kneaded product was cooled and coarsely pulverized down to 1 mm or less using a hammer mill, to yield a coarsely pulverized product. The obtained coarsely pulverized product was finely pulverized using a mechanical pulverizer (T-250, by Freund-Turbo Corporation). The resulting product was classified using Faculty F-300 (by Hosokawa Micron Corporation), to yield a toner particle. The operating conditions were set to a rotational speed of 130 $s^{-1}$ of a classification rotor, and a rotational speed of 120 $s^{-1}$ of a distribution rotor.

The obtained toner particle was thermally treated in a surface treatment apparatus, to yield a thermally treated toner particle. The operating conditions included feed amount=3 kg/hr, hot air temperature=130° C., hot air flow rate=6 $m^3$/min, cold air temperature=−5° C., cold air flow rate=4 $\mu m^3$/min, blower air volume=20 $m^3$/min, and injection air flow rate=1 $\mu m^3$/min. The obtained toner particle was subjected to external addition in the same way as in the production example of Toner 1, to yield Comparative toner 9.

Herein a TOF-SIMS analysis of Comparative toner 9 revealed no peak of Structural formula (A), even after 75 sputtering runs under the above conditions. No peak was observed down to 200 nm after an additional 75 sputtering runs.

Example 1

A process cartridge filled with Toner 1 was allowed to stand at 25° C. and 40% RH for 48 hours. An unfixed image of an image pattern having nine 10 mm×10 mm square images uniformly distributed over the entirety of transfer paper was outputted using LBP-712Ci modified to operate even with the fixing unit removed therefrom. The toner laying amount on the transfer paper was set to 0.80 μmg/$cm^2$, and the fixing onset temperature was evaluated.

The transfer paper used was A4 ordinary paper ("Plover Bond paper": 105 g/$m^2$, by the Fox River Paper Company) and A4 glossy paper ("BROCHURE PAPER 150 g GLOSSY paper": by the Hewlett-Packard Company: 150 g/$m^2$). The fixing unit of LBP-712Ci was removed and, in place thereof, an external fixing unit was used that was capable of operating also outside the laser beam printer.

Toner Evaluation Method

<1> Low-Temperature Fixability

The fixation temperature of the external fixing unit was raised from 100° C., in increments of 5° C., and the ordinary paper was fixed under conditions of process speed of 330 mm/sec. Using a Kim Wipe (S-200, by Nippon Paper Crecia Co., Ltd.), the fixed image is rubbed 10 times under a load of 7.35 kPa (75 g/$cm^2$), and the temperature at which an image density decrease rate before and after rubbing is lower than 5% is taken as the fixing onset temperature. The fixing onset temperature was evaluated on the basis of the criteria below, with C or better deemed as a good rating. Table 5 sets out the evaluation results.

Evaluation Criteria

A: Fixing onset temperature lower than 110° C.

B: Fixing onset temperature from 115° C. to 120° C.

C: Fixing onset temperature from 125° C. to 130° C.

D: Fixing onset temperature of 135° C. or higher

<2> White Spots

Ten fixed images for the fixing onset temperature in the evaluation of <1> above were used herein. The number of white spots was evaluated, from the ten obtained fixed images, on the basis of the criteria below, with C or better deemed as a good rating. Table 5 sets out the evaluation results.

Evaluation Criteria

A: Fewer than 5 white spots

B: From 5 to fewer than 10 white spots

C: From 10 to fewer than 15 white spots

D: 15 or more white spots

<3> Gloss

In the evaluation of <1> above, fixing was performed on gloss paper at a temperature that was 20° C. higher than the fixing onset temperature, under conditions of process speed of 330 mm/sec. A gloss value was measured using a handy-type gloss meter PG-1 (by Nippon Denshoku Industries Co., Ltd.). Among measurement conditions, a light projection angle and a light reception angle were adjusted to 750 each, and an average of the measurements of all the image patterns disposed at the nine points was evaluated. The average value of gloss was evaluated on the basis of the criteria below, with C or better deemed as a good rating. Table 5 sets out the evaluation results.

Gloss Evaluation Criteria

A: Gloss average value of 60 or higher

B: Gloss average value from 50 to less than 60

C: Gloss average value from 40 to less than 50

D: Gloss average value lower than 40.

Examples 2 to 21 and Comparative Examples 1 to 9

The toners were evaluated in the same way as in Example 1. Table 5 sets out the evaluation results.

TABLE 5

| Example No. | Toner No. | Low-temperature fixability: Fixation temperature ° C. | Low-temperature fixability: rank | White spots: Spots | White spots: rank | Gloss: Average value | Gloss: rank |
|---|---|---|---|---|---|---|---|
| 1 | 1 | 100 | A | 0 | A | 65 | A |
| 2 | 2 | 105 | A | 0 | A | 65 | A |
| 3 | 3 | 110 | A | 2 | A | 65 | A |
| 4 | 4 | 100 | A | 3 | A | 60 | A |
| 5 | 5 | 105 | A | 1 | A | 65 | A |
| 6 | 6 | 105 | A | 5 | B | 65 | A |
| 7 | 7 | 100 | A | 4 | A | 62 | A |
| 8 | 8 | 100 | A | 8 | B | 62 | A |
| 9 | 9 | 105 | A | 5 | B | 62 | A |
| 10 | 10 | 120 | B | 0 | A | 65 | A |
| 11 | 11 | 120 | B | 0 | A | 65 | A |
| 12 | 12 | 125 | C | 0 | A | 70 | A |
| 13 | 13 | 120 | B | 4 | A | 65 | A |
| 14 | 14 | 125 | C | 11 | C | 65 | A |
| 15 | 15 | 100 | A | 7 | B | 55 | B |
| 16 | 16 | 100 | A | 10 | C | 48 | C |
| 17 | 17 | 120 | B | 2 | A | 50 | B |
| 18 | 18 | 115 | B | 2 | A | 44 | C |
| 19 | 19 | 115 | B | 0 | A | 60 | A |
| 20 | 20 | 100 | A | 7 | B | 50 | B |
| 21 | 21 | 100 | A | 9 | B | 42 | C |
| C.E. 1 | C. 1 | 100 | A | 16 | D | 22 | D |
| C.E. 2 | C. 2 | 115 | B | 6 | B | 25 | D |
| C.E. 3 | C. 3 | 125 | C | 6 | B | 35 | D |
| C.E. 4 | C. 4 | 105 | A | 11 | C | 38 | D |
| C.E. 5 | C. 5 | 110 | A | 13 | C | 35 | D |
| C.E. 6 | C. 6 | 140 | D | 15 | D | 55 | B |
| C.E. 7 | C. 7 | 140 | D | 0 | A | 44 | C |
| C.E. 8 | C. 8 | 100 | A | 20 | D | 49 | C |
| C.E. 9 | C. 9 | 100 | A | 16 | D | 31 | D |

In the Table 5, "C.E." indicates "Comparative example" and "C" indicates "Comparative".

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-184231, filed Nov. 17, 2022, which is hereby incorporated by reference herein in its entirety.

What is claimed is:

1. A toner comprising a toner particle, wherein the toner comprises a crystalline vinyl resin and an amorphous resin, the toner has a weight-average particle diameter of 4.0 to 12.0 μm; and an endothermic quantity ΔH derived from the crystalline vinyl resin in a differential scanning calorimetric measurement of the toner is 10 to 70 J/g;

in an analysis by time-of-flight secondary ion mass spectrometry of the toner particle, while under sputtering over a sputtering time during which 100 nm of a polymethyl methacrylate standard sample film are shaved, with A(100) as an amount of ions represented by Formula (A) below at the sputtering time of which 100 nm of the standard sample film are shaved;

the amount of ions represented by Formula (A) exhibits one or more peak values, from the start of a measurement over a sputtering time during which 100 nm of the standard sample film are shaved;

and with $A(d_{max})$ as a maximum value from among the peak values, the $A(d_{max})$ and A(100) satisfy Expression (1) below, $$1.5 \leq A(d_{max})/A(100) \leq 30.0 \quad (1)$$

$$—(CH_2)_n— \quad (A)$$

where in Formula (A), n is from 18 to 30.

2. The toner according to claim 1, wherein the toner particle comprises 15.0 to 70.0 μmass % of the crystalline vinyl resin.

3. The toner according to claim 1, wherein the crystalline vinyl resin comprises 50.0 to 95.0 μmass % of a monomer unit (a) represented by Formula (a) below;

(a)

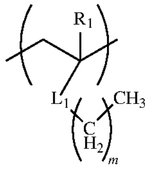

where, in Formula (a), $R_1$ represents a hydrogen atom or a methyl group, Li represents a single bond, an ester bond or an amide bond, and m represents an integer from 15 to 31.

4. The toner according to claim 1, wherein the toner particle comprises 20.0 to 70.0 μmass % of the amorphous resin.

5. The toner according to claim 1, wherein the amorphous resin comprises a vinyl resin; and the toner particle comprises 25.0 to 65.0 μmass % of the vinyl resin as the amorphous resin.

6. The toner according to claim 1, wherein the crystalline vinyl resin comprises a crystalline vinyl resin A not containing a monomer unit (b) represented by Formula (b) below, and a crystalline vinyl resin B containing the monomer unit (b) represented by Formula (b) below; and the toner particle comprises 1.5 to 15.0 μmass % of the crystalline vinyl resin B;

(b)

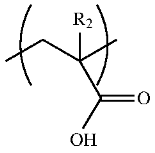

where, in Formula (b), $R_2$ represents a hydrogen atom or a methyl group.

7. The toner according to claim 1, wherein depth $d_{max}$ (nm) from surface of the toner particle at which the $A(d_{max})$ is observed is 20 to 75 nm.

* * * * *